US008829115B2

(12) United States Patent
Hermel-Davidock et al.

(10) Patent No.: US 8,829,115 B2
(45) Date of Patent: *Sep. 9, 2014

(54) ETHYLENE-BASED POLYMER COMPOSITION

(75) Inventors: Theresa J. Hermel-Davidock, Newton, NJ (US); Mehmet Demirors, Pearland, TX (US); Sarah M. Hayne, Houston, TX (US); Rongjuan Cong, Lake Jackson, TX (US); Lori L. Kardos, Lake Jackson, TX (US); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/581,726

(22) PCT Filed: Mar. 2, 2011

(86) PCT No.: PCT/US2011/026929
§ 371 (c)(1),
(2), (4) Date: Nov. 7, 2012

(87) PCT Pub. No.: WO2011/109563
PCT Pub. Date: Sep. 9, 2011

(65) Prior Publication Data
US 2013/0046061 A1    Feb. 21, 2013

Related U.S. Application Data

(63) Continuation of application No. 12/716,004, filed on Mar. 2, 2010, now abandoned.

(60) Provisional application No. 61/222,371, filed on Jul. 1, 2009.

(51) Int. Cl.
| C08L 23/04 | (2006.01) |
| C08F 2/00 | (2006.01) |
| C08F 4/642 | (2006.01) |
| C08F 4/659 | (2006.01) |
| C08F 10/02 | (2006.01) |
| C08L 23/08 | (2006.01) |
| C08F 10/00 | (2006.01) |
| C08F 210/16 | (2006.01) |
| B32B 27/32 | (2006.01) |
| C08L 23/02 | (2006.01) |

(52) U.S. Cl.
CPC .......... *C08L 23/04* (2013.01); *C08L 23/08* (2013.01); *C08L 23/0815* (2013.01); *C08F 210/16* (2013.01); *C08L 2205/02* (2013.01); *C08F 10/00* (2013.01); *C08L 23/02* (2013.01)
USPC ........... 525/240; 526/65; 526/160; 526/161; 526/172; 526/348; 526/348.2

(58) Field of Classification Search
USPC ............. 526/65, 160, 161, 348, 172, 348.2; 525/240
See application file for complete search history.

(56) References Cited

U.S. PATENT DOCUMENTS

| 3,485,706 | A | 12/1969 | Evans |
| 4,322,027 | A | 3/1982 | Reba |
| 4,340,563 | A | 7/1982 | Appel et al. |
| 4,413,110 | A | 11/1983 | Kavesh et al. |
| 4,663,220 | A | 5/1987 | Wisneski et al. |
| 4,668,566 | A | 5/1987 | Braun |
| 5,844,045 | A | 12/1998 | Kolthammer et al. |
| 5,869,575 | A | 2/1999 | Kolthammer et al. |
| 6,420,507 | B1 | 7/2002 | Kale et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 7,858,707 | B2 | 12/2010 | Arriola et al. |
| 8,101,696 | B2 | 1/2012 | Konze et al. |
| 8,263,206 | B2 | 9/2012 | Kronawittleithner et al. |
| 8,372,931 | B2 * | 2/2013 | Hermel-Davidock et al. ............ 526/352 |
| 2001/0016632 | A1 | 8/2001 | Sipos |
| 2005/0164872 | A1 * | 7/2005 | Boussie et al. ............ 502/103 |
| 2005/0254731 | A1 | 11/2005 | Berbert et al. |
| 2006/0188678 | A1 | 8/2006 | Ohlsson et al. |
| 2010/0028523 | A1 | 2/2010 | Asama et al. |
| 2011/0015346 | A1 | 1/2011 | Hermel-Davidock et al. |
| 2012/0129417 | A1 | 5/2012 | Taha et al. |
| 2013/0150537 | A1 * | 6/2013 | Hermel-Davidock et al. . 526/65 |

FOREIGN PATENT DOCUMENTS

WO    WO 2007/136506 A2 * 11/2007

OTHER PUBLICATIONS

Balke, Mourey, et al (Mourey and Balke, Chromatography Polym., Chapter 12, (1992)).
Balke, Thitiratsakul, Lew, Cheung, Mourey, Chromatography Polym., Chapter 13, (1992.
Zimm (Zimm, B.H., J. Chem. Phys., 16, 1099 (1948).
PCT/ US2011/026929, International Search Report and Written Opinion of the International Searching Authority.
PCT/ US2011/026929, International Preliminary Report on Patentability.

* cited by examiner

Primary Examiner — Fred M Teskin

(57) ABSTRACT

An ethylene-based polymer composition has been discovered and is characterized by a Comonomer Distribution Constant greater than about 45. The new ethylene-based polymer compositions are useful for making many articles, especially including films. The polymers are made using a metal complex of a polyvalent aryloxyether.

17 Claims, 14 Drawing Sheets

$$CDC = \frac{Comonomer\ Distrubution\ Index}{Comonomer\ Distribution\ Shape\ Factor} = \frac{Comonomer\ Distribution\ Index}{Half\ Width/Stdev} * 100$$

Equation 1

Fig. 1

$$\int_{35}^{119.0} w_T(T)dT = 1$$

Equation 2

Fig. 2

$$\int_{35}^{T_{median}} w_T(T)dT = 0.5$$

Equation 3

Fig. 3

$$\ln(1 - comonomercontent) = -\frac{207.26}{273.12 + T} + 0.5533$$

$$R^2 = 0.997$$

Equation 4

Fig. 4

$$Stdev = \sqrt{\sum_{35.0}^{119.0} (T - T_p)^2 * w_T(T)}$$

Equation 5

Fig. 5

% Crystallinity = (($H_f$)/(292 J/g)) x 100

Equation 6

Fig. 6

$$g_i' = (IV_{Sample,i} / IV_{linear\ reference,j})$$

Equation 7

Fig. 7

$$\left[\frac{IV_{Sample,i}}{IV_{linear\_reference,j}}\right]^{1.33}_{M_{i=j}} = \left[\left(1+\frac{B_{n,i}}{7}\right)^{1/2} + \frac{4}{9}\frac{B_{n,i}}{\pi}\right]^{-1/2}$$

Equation 8

Fig. 8

$$LCBf = \frac{\sum_{M=3500}^{i}\left(\frac{B_{n,i}}{M_i/14000}c_i\right)}{\sum c_i}$$

Equation 9

Fig. 9

$$M_{PE} = \left(\frac{K_{PS}}{K_{PE}}\right)^{1/\alpha_{PE}+1} M_{PS}^{\alpha_{PS}+1/\alpha_{PE}+1}$$

Equation 10

Fig. 10

$$[\eta]_{PE} = K_{PS} \, M_{PS}^{\alpha+1} / M_{PE}$$

Equation 11

Fig. 11

$$M_W = \sum_i w_i M_i = \sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS \; Area}{Conc. \; Area}$$

Equation 12

Fig. 12

$$IV = [\eta] = \sum_i w_i IV_i = \sum_i \left( \frac{C_i}{\sum_i C_i} \right) IV_i = \frac{\sum_i C_i IV_i}{\sum_i C_i} = \frac{\sum_i DP_i}{\sum_i C_i} = \frac{DP\ Area}{Conc.\ Area}$$

Equation 13

Fig. 13

$$Mw_{CC} = \sum_i \left( \frac{C_i}{\sum_i C_i} \right) M_i = \sum_i w_i M_i$$

Equation 14

Fig. 14

$$[\eta]_{CC} = \sum_i \left( \frac{C_i}{\sum_i C_i} \right) IV_i = \sum_i w_i IV_i$$

Equation 15

Fig. 15

$$gpcBR = \left[\left(\frac{[\eta]_{CC}}{[\eta]}\right) \cdot \left(\frac{M_w}{M_{w,CC}}\right)^{\alpha_{PE}} - 1\right]$$

Equation 16

Fig. 16

$$\text{Resolution} = \frac{\text{Peak temperature of NIST 1475a - Peak Temperature of Hexacontane}}{\text{Half-height Width of NIST 1475a + Half-height Width of Hexacontane}}$$

Equation 17

Fig. 17

$$ZSVR = \frac{\eta_{0B}}{\eta_{0L}} = \frac{\eta_{0B}}{2.29 \times 10^{-15} M_{w-gpc}^{3.65}}$$

Equation 18

Fig. 18

```
;lc1prf2_zz
prosol relations=<lcnmr>
#include <Avance.incl>

"d12=20u"
"d11=4u"

1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit ph1=0 2 2 0 1 3 3 1
ph29=0
ph31=0 2 2 0 1 3 3 1
```

Figure 21

$$M_{polyethylene} = A(M_{polystyrene})^B$$

Equation 26

Fig. 26

$$M_w(cc) = \frac{\sum_i RI_i * M_{cc,i}}{\sum_i RI_i}$$

Equation 27

Fig. 27

ETHYLENE-BASED POLYMER COMPOSITION

CROSS-REFERENCE TO RELATED APPLICATIONS

This application is a national stage entry of PCT/US11/26929, filed on Mar. 2, 2011, which is a continuation of U.S. non-provisional patent application Ser. No. 12/716,004, filed on Mar. 2, 2010, now abandoned, which claims priority from U.S. Provisional Patent Application No. 61/222,371, filed on Jul. 1, 2009, the disclosures of which are incorporated herein by reference for purposes of U.S. practice.

BACKGROUND OF THE INVENTION

There have been many varieties of polyethylene polymers polymerized over the years, including those made using high pressure free radical chemistry (LDPE), more traditional linear low density polyethylene (LLDPE) typically made using Ziegler-Natta catalysis or metallocene or constrained geometry catalyzed polyethylene. Some linear polyethylenes, but also some substantially linear polyethylenes, contain a slight amount of long chain branching. While these polymers have varying positives and negatives—depending on application or end-use—more control over the polymer structure is still desired.

We have now found that post-metallocene catalysts can efficiently polymerize ethylene into polymers and polymer compositions having controlled comonomer distribution profiles, while also controlling unsaturation levels in the polymer.

BRIEF SUMMARY OF THE INVENTION

The instant invention provides an ethylene-based polymer composition, and the method for producing the same, films made therefrom. In one embodiment, the invention is an ethylene-based polymer composition characterized by a Comonomer Distribution Constant (CDC) greater than about 45, more preferably greater than 50, most preferably greater than 95, and as high as 400, for example, as high as 350, or in the alternative, as high as 300, or in the alternative, as high as 250, or in the alternative, as high as 200, wherein the composition has less than 120 total unsaturation unit/1,000,000 C, for example, less than 110 total unsaturation unit/1,000,000, or in the alternative, less than 100 total unsaturation unit/1,000,000 C, or in the alternative, less than 80 total unsaturation unit/1,000,000 C, or in the alternative, less than 70 total unsaturation unit/1,000,000 C. Preferably, the composition has less than 15 trisubstituted unsaturation units/1,000,000 C, for example, less than 12 trisubstituted unsaturation units/1,000,000 C, or in the alternative, less than 10 trisubstituted unsaturation units/1,000,000 C, or in the alternative, less than 8 trisubstituted unsaturation units/1,000,000 C, or in the alternative, less than 5 trisubstituted unsaturation units/1,000,000 C. Preferably, the ethylene-based polymer compositions comprise up to about 3 long chain branches/1000 carbons, more preferably from about 0.01 to about 3 long chain branches/1000 carbons. The ethylene-based polymer composition can have a Zero Shear viscosity ratio (ZSVR) of at least 2 and/or less than 50 The ethylene-based polymer compositions can be further characterized by comprising less than 20 vinylidene unsaturation unit/1,000,000 C, for example, less than 18 vinylidene unsaturation unit/1,000,000 C, or in the alternative, less than 15 vinylidene unsaturation unit/1,000,000 C, or in the alternative, less than 12 vinylidene unsaturation unit/1,000,000 C, or in the alternative, less than 10 vinylidene unsaturation unit/1,000,000 C. The inventive ethylene-based polymer compositions can have a bimodal molecular weight distribution (MWD) or a multi-modal MWD. The inventive ethylene-based polymer compositions can also have a monomodal MWD. The inventive ethylene-based polymer compositions can have a comonomer distribution profile comprising a mono or bimodal distribution from 35° C. to 120° C., excluding the purge. The comonomer distribution profile is obtained by crystallization elution fractionation (CEF). The inventive ethylene-based polymer compositions can comprise a single DSC melting peak. The inventive ethylene-based polymer compositions can also comprise bimodal, or multiple melting peaks. The ethylene-based polymer compositions can comprise a weight average molecular weight ($M_w$) from 17,000 to 220,000 g/mol, for example, from 60,000 to 220,000 g/mol, from 70,000 to 140,000 g/mol.

Preferably, a film comprising the inventive ethylene-based polymer composition is characterized as having a yellowness b* changing over 10 days of 3 or less, more preferably 2 or less, and especially 1 or less.

The present invention further provides a thermoplastic composition comprising the above-described inventive ethylene-based polymer composition and optionally one or more polymers.

The present invention further provides a film comprising (1) at least one layer comprising a thermoplastic composition comprising (a) the inventive ethylene-based polymer composition and (b) optionally one or more polymers; and (2) optionally one or more layers.

The present invention further provides a multilayer structure comprising a film comprising (1) at least one layer comprising a thermoplastic composition comprising (a) the inventive ethylene-based polymer composition and (b) optionally one or more polymers; and (2) optionally one or more layers.

A storage device comprising a film comprising (1) at least one layer comprising a thermoplastic composition comprising (a) the inventive ethylene-based polymer composition and (b) optionally one or more polymers; and (2) optionally one or more layers.

Fabricated articles comprising the novel polymer compositions are also contemplated, especially in the form of at least one film layer. Other embodiments include thermoplastic formulations comprising the novel polymer composition and at least one natural or synthetic polymer.

The ethylene-based polymer composition can be at least partially cross-linked (at least 5% (weight) gel).

In another embodiment, the present invention is a process comprising:

(A) polymerizing ethylene and optionally one or more α-olefins in the presence of a first catalyst to form a semi-crystalline ethylene-based polymer in a first reactor or a first part of a multi-part reactor; and (B) reacting freshly supplied ethylene and optionally one or more α-olefins in the presence of a second catalyst comprising an organometallic catalyst thereby forming an ethylene-based polymer composition in at least one other reactor or a later part of a multi-part reactor, wherein the catalyst of (A) and (B) can be the same or different and each is a metal complex of a polyvalent aryloxyether corresponding to the formula:

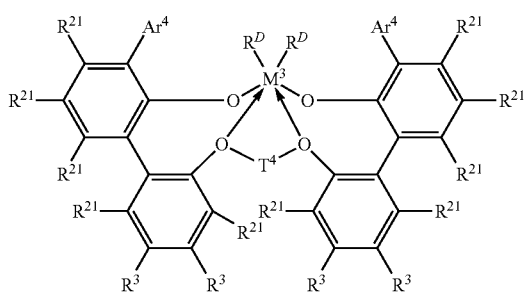

where $M^3$ is Ti, Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group, especially where the reaction of step (B) occurs by graft polymerization.

In yet another embodiment, the present invention is a method of characterizing an ethylene based polymer for comonomer composition distribution (CDC), wherein CDC is calculated from comonomer distribution profile by CEF, and CDC is defined as Comonomer Distribution Index divided by Comonomer Distribution Shape Factor multiplying by 100 as shown in Equation 1, FIG. 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp), and wherein the method comprises the following steps In yet another embodiment, the present invention is a method of characterizing an ethylene based polymer for comonomer composition distribution (CDC), wherein CDC is calculated from comonomer distribution profile by CEF, and CDC is defined as Comonomer Distribution Index divided by Comonomer Distribution Shape Factor multiplying by 100 as shown in Equation 1, FIG. 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp), and wherein the method comprises the following steps:

(A) Obtain a weight fraction at each temperature (T) ($w_T$ (T)) from 35.0° C. to 119.0° C. with a temperature step increase of 0.200° C. from CEF according to Equation 2, as shown in FIG. 2;

(B) Calculate the median temperature ($T_{median}$) at cumulative weight fraction of 0.500, according to Equation 3, as shown in FIG. 3;

(C) Calculate the corresponding median comonomer content in mole % ($C_{median}$) at the median temperature ($T_{median}$) by using comonomer content calibration curve according to Equation 4, as shown in FIG. 4;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Formula 4, FIG. 4, wherein: $R^2$ is the correlation constant;

(F) Calculate Comonomer Distribution Index from the total weight fraction with a comonomer content ranging from $0.5 * C_{median}$ to $1.5 * C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according Equation 5, as shown in FIG. 5.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has a density in the range of 0.900 to 0.965 g/cm³; for example, 0.905 to 0.930 g/cm³.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has melt index ($I_2$) of 0.1 to 1000 g/10 minutes; for example, 0.1 to 5.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has $I_{10}/I_2$ of less than 20, for example, 6-20.

In an alternative embodiment, the instant invention provides articles/films/multilayer structures/storage devices made therefrom, and method of making the same, in accordance with any of the preceding embodiments, except that film has a thickness in the range of 0.5 to 10 mil.

BRIEF DESCRIPTION OF THE DRAWINGS

For the purpose of illustrating the invention, there is shown in the drawings a form that is exemplary; it being understood, however, that this invention is not limited to the precise arrangements and illustrations shown.

FIGS. 1-18 illustrate Equations 1-18, respectively;

FIG. 21 illustrates the modified pulse sequences for unsaturation with Bruker AVANCE 400 MHz spectrometer;

FIGS. 26-27 illustrate Equations 26-27, respectively.

DETAILED DESCRIPTION OF THE INVENTION

Figure 19:
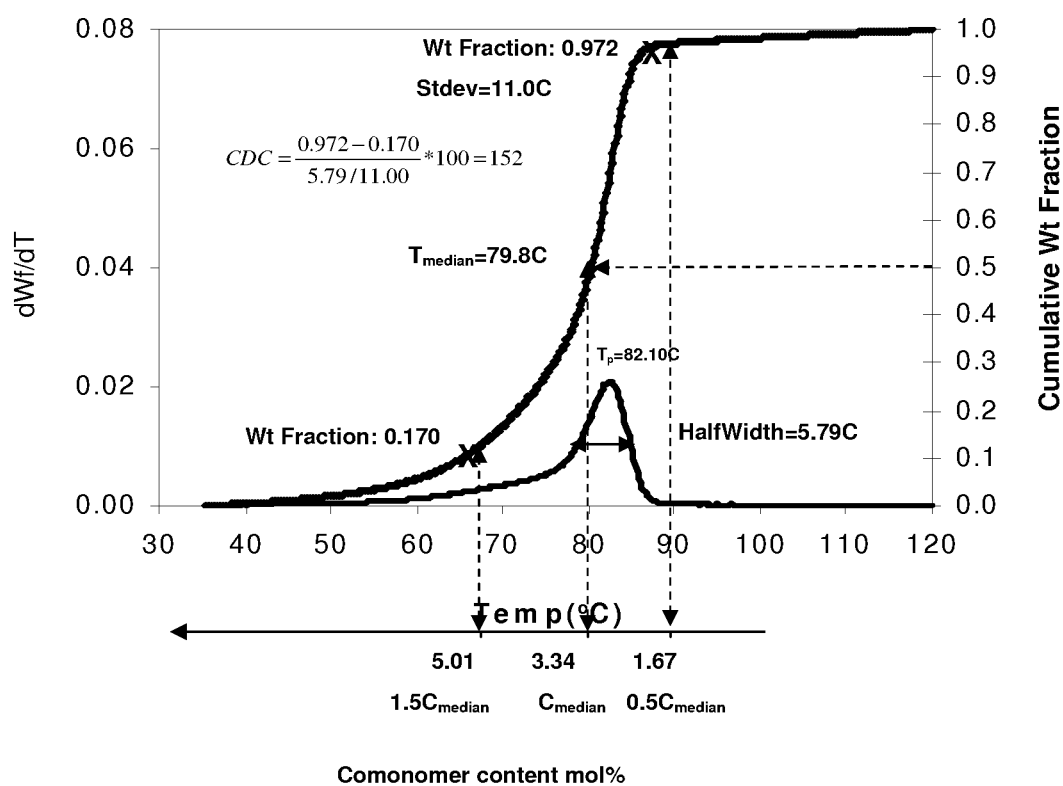
FIG. 19 is a graphical illustration of CDC calculation obtaining peak temperature, half width and median temperature from CEF, showing comonomer distribution profile of Example 3.

The instant invention provides an ethylene-based polymer composition, and the method for producing the same. The inventive ethylene-based polymer composition according to the present inventions is characterized by a Comonomer Distribution Constant greater than about 45, more preferably greater than 50, most preferably greater than 95, and as high as 400, for example, as high as 350, or in the alternative, as high as 300, or in the alternative, as high as 250, or in the alternative, as high as 200, wherein the inventive ethylene-based polymer composition has less than 120 total unsaturation unit/1,000,000 C, for example, less than 110 total unsaturation unit/1,000,000, or in the alternative, less than 100 total unsaturation unit/1,000,000 C, or in the alternative, less than 80 total unsaturation unit/1,000,000 C, or in the alternative, less than 70 total unsaturation unit/1,000,000 C. The inventive composition has less than 15 trisubstituted unsaturation units/1,000,000 C, for example, less than 12 trisubstituted unsaturation units/1,000,000 C, or in the alternative, less than 10 trisubstituted unsaturation units/1,000,000 C, or in the alternative, less than 8 trisubstituted unsaturation units/1,000,000 C, or in the alternative, less than 5 trisubstituted unsaturation units/1,000,000 C. The ethylene-based polymer compositions can be further characterized by comprising less than 20 vinylidene unsaturation unit/1,000,000 C, for example, less than 18 vinylidene unsaturation unit/1,000,000 C, or in the alternative, less than 15 vinylidene unsaturation unit/1,000,000 C, or in the alternative, less than 12 vinylidene unsaturation unit/1,000,000 C, or in the alternative, less than 10 vinylidene unsaturation unit/1,000,000 C. Preferably, the inventive ethylene-based polymer compositions comprise up to about 3 long chain branches/1000 carbons, more preferably from about 0.01 to about 3 long chain branches/1000 carbons. The inventive ethylene-based polymer compositions can have a ZSVR of at least 2 and/or 50. The inventive ethylene-based polymer compositions can be further characterized by comprising less than 20 vinylidene unsaturation unit/1,000,000 C, for example, less than 18 vinylidene unsaturation unit/1,000,000 C, or in the alternative, less than 15 vinylidene unsaturation unit/1,000,000 C, or in the alternative, less than 12 vinylidene unsaturation unit/1,000,000 C, or in the alternative, less than 10 vinylidene unsaturation unit/1,000,000 C. The inventive ethylene-based polymer compositions can have a bimodal molecular weight distribution (MWD) or a multimodal MWD. The inventive ethylene-based polymer compositions can have a comonomer distribution profile comprising a mono or bimodal distribution in the temperature range of from 35° C. to 120° C., excluding purge. The inventive ethylene-based polymer compositions can comprise a single DSC melting peak. The inventive ethylene-based polymer compositions can comprise a weight average molecular weight ($M_w$) from about 17,000 to about 220,000, for example, from 60,000 to 220,000 g/mol, from 70,000 to 140,000 g/mol.

The inventive ethylene-based polymer compositions are made using a metal complex of a polyvalent aryloxyether.

In one embodiment, the inventive ethylene-based polymer composition is characterized by a Comonomer Distribution Constant greater than about 45, more preferably greater than 50, most preferably greater than 95, and as high as 400, preferably as high as 200, wherein the composition has less than 120 total unsaturation unit/1,000,000 C.

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition comprises up to about 3 long chain branches/1000 carbons, preferably from about 0.01 to about 3 long chain branches/1000 carbons.

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition has a ZSVR of at least 2, and optionally the inventive ethylene-based polymer composition is characterized by comprising less than 20 vinylidene unsaturation unit/1,000,000 C.

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition has a bimodal molecular weight distribution (MWD).

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition has a multi-modal MWD.

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition has a single DSC melting peak.

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition has been at least partially cross-linked (at least 5% gel).

In one embodiment, the inventive ethylene-based polymer composition is characterized by a Comonomer Distribution Constant greater than about 45, more preferably greater than 50, most preferably greater than 95, and as high as 400, preferably as high as 200, wherein the inventive ethylene-based polymer composition has less than 120 total unsaturation unit/1,000,000 C, and wherein the inventive ethylene-based polymer composition has a comonomer distribution profile comprising a mono or bimodal distribution in the temperature range of from 35° C. to 120° C., excluding purge.

The present invention further provides a thermoplastic formulation comprising the inventive ethylene-based polymer composition, as described herein, and at least one natural or synthetic polymer.

The present invention further provides a film comprising the inventive ethylene-based polymer composition, which is characterized as having a yellowness b* changing over 10 days of 3 or less, more preferably 2 or less, and especially 1 or less.

The present invention further provides a film comprising (1) at least one layer comprising a thermoplastic composition comprising (a) the inventive ethylene-based polymer composition and (b) optionally one or more polymers; and (2) optionally one or more layers.

The present invention further provides a multilayer structure comprising a film comprising (1) at least one layer comprising a thermoplastic composition comprising (a) the inventive ethylene-based polymer composition and (b) optionally one or more polymers; and (2) optionally one or more layers.

The present invention further provides a storage device comprising a film comprising (1) at least one layer comprising a thermoplastic composition comprising (a) the inventive ethylene-based polymer composition and (b) optionally one or more polymers; and (2) optionally one or more layers.

The present invention further provides a fabricated article comprising the inventive ethylene-based polymer composition, as described herein.

In another embodiment, the invention is a process comprising:

(A) polymerizing ethylene and optionally one or more α-olefins in the presence of a first catalyst to form a semi-crystalline ethylene-based polymer in a first reactor or a first part of a multi-part reactor; and (B) reacting freshly supplied ethylene and optionally one or more α-olefins in the presence of a second catalyst comprising an organometallic catalyst thereby forming an ethylene-based polymer composition in at least one other reactor or a later part of a multi-part reactor, wherein the catalyst of (A) and (B) can be the same or different and each is a metal complex of a polyvalent aryloxyether corresponding to the formula:

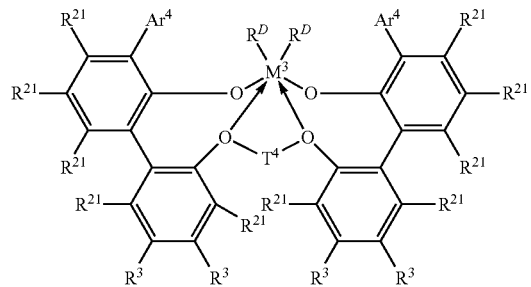

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

In yet another embodiment, the present invention is a method of characterizing an ethylene based polymer for comonomer composition distribution (CDC), wherein CDC is calculated from comonomer distribution profile by CEF, and CDC is defined as Comonomer Distribution Index divided by Comonomer Distribution Shape Factor multiplying by 100 as shown in Equation 1, FIG. 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp), and wherein the method comprises the following steps:

(A) Obtain a weight fraction at each temperature (T) ($w_T(T)$) from 35.0° C. to 119.0° C. with a temperature step increase of 0.200° C. from CEF according to Equation 2, as shown in FIG. 2;

(B) Calculate the median temperature ($T_{median}$) at cumulative weight fraction of 0.500, according to Equation 3, as shown in FIG. 3;

(C) Calculate the corresponding median comonomer content in mole % ($C_{median}$) at the median temperature ($T_{median}$) by using comonomer content calibration curve according to Equation 4, as shown in FIG. 4;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Formula 4, FIG. 4, wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according Equation 5, as shown in FIG. 5.

In some processes, processing aids, such as plasticizers, can also be included in the inventive ethylene-based polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex.).

In some processes, inventive ethylene-based polymer compositions are treated with one or more stabilizers, for example, antioxidants, such as IRGANOX 1010 and IRGAFOS168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The inventive ethylene-based polymer composition may, for example, comprise less than 10 percent by the combined weight of one or more additives, based on the weight of the inventive ethylene-based polymer composition. A particular benefit of the claimed polymers is the absence of catalyst kill agents, other than water, thus eliminating the need for calcium stearate.

The inventive ethylene-based polymer composition produced may further be compounded. In some embodiments, one or more antioxidants may further be compounded into the inventive ethylene-based polymer compositions and the compounded polymer pelletized. The compounded ethylene-based polymer composition may contain any amount of one or more antioxidants. For example, the compounded inventive ethylene-based polymer compositions may comprise from about 200 to about 600 parts of one or more phenolic antioxidants per one million parts of the inventive ethylene-based polymer compositions. In addition, the compounded ethylene-based polymer composition may comprise from about 800 to about 1200 parts of a phosphite-based antioxidant per one million parts of inventive ethylene-based polymer compositions. The compounded inventive ethylene-based polymer compositions may further comprise from about 300 to about 1250 parts of calcium stearate per one million parts of inventive ethylene-based polymer compositions.

Uses

The inventive ethylene-based polymer compositions may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or nonwoven fabrics. Thermoplastic compositions comprising the inventive ethylene-based polymer compositions include blends with other natural or synthetic materials, polymers, additives, reinforcing agents, ignition resistant additives, antioxidants, stabilizers, colorants, extenders, crosslinkers, blowing agents, and plasticizers.

The inventive ethylene-based polymer compositions may be used in producing fibers for other applications. Fibers that may be prepared from the inventive ethylene-based polymer compositions or blends thereof include staple fibers, tow, multicomponent, sheath/core, twisted, and monofilament. Suitable fiber forming processes include spunbonded and melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

Additives and adjuvants may be added to the inventive ethylene-based polymer compositions post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the inventive ethylene-based polymer compositions with other polyolefins may be performed. Suitable polymers for blending with the inventive ethylene-based polymer compositions include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical low density polyethylene (LDPE), Ziegler-Natta linear low density polyethylene (LLDPE), metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, Acrylonitrile-Butadiene-Styrene (ABS), styrene/butadiene block copolymers and hydrogenated derivatives thereof (Styrene-Butadiene-Styrene (SBS) and Styrene-Ethylene-Butadiene-Styrene (SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the inventive ethylene-based polymer.

The inventive ethylene-based polymer compositions maybe employed as sealant resins. Surprisingly, certain short chain branching distribution (SCBD), as shown by CDC, in combination with certain MWD, and a certain level of long chain branching (LCB) has shown to improve hot tack and heat seal performance, including increased hot-tack & heat-seal strength, lower heat seal and hot tack initiation temperatures, and a broadening of the hot tack window. The inventive ethylene-based polymer compositions may be employed as a pipe and tubing resin through an optimization of the SCBD and MWD, with low unsaturation levels for improved ESCR (environmental stress crack resistance) and higher PENT (Pennsylvania Edge-Notch Tensile Test). The inventive ethylene-based polymer compositions may be employed in applications where ultraviolet (UV) stability, weatherability are desired through an optimization of the SCBD and MWD, in combination with low unsaturation levels, and low levels of low molecular weight, high comonomer incorporated oligomers. The inventive ethylene-based polymer compositions may be employed in applications where low levels of plate-out, blooming, die build-up, smoke formation, extractables, taste, and odor are desired through an optimization of the SCBD and MWD with low levels of low molecular weight, high comonomer incorporated oligomers. The inventive ethylene-based polymer compositions may be employed in stretch film applications. Surprisingly, certain SCBD, in combination with certain MWD, and a certain level of long chain branching (LCB) shows improved stretchability and dynamic puncture resistance.

Definitions

The term "composition," as used, includes a mixture of materials which comprise the composition, as well as reaction products and decomposition products formed from the materials of the composition.

The terms "blend" or "polymer blend," as used herein, refers to an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be affected by physically mixing the two or more polymers on the macro level (for example, melt blending resins or compounding) or the micro level (for example, simultaneous forming within the same reactor).

The term "linear" as used herein refers to polymers where the polymer backbone of the polymer lacks measurable or demonstrable long chain branches, for example, the polymer is substituted with an average of less than 0.01 long branch per 1000 carbons.

The term "polymer" as used herein, refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined, below. The terms "ethylene/α-olefin polymer" is indicative of interpolymers as described.

The term "interpolymer" as used herein, refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

Resin Production

All raw materials (ethylene, 1-octene) and the process solvent (a narrow boiling range high-purity isoparaffinic solvent commercially available under the tradename Isopar E from Exxon Mobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure of approximately from 400 to 750 psig. The solvent and comonomer (1-octene) feed is pressurized via mechanical positive displacement pump to above reaction pressure of approximately from 400 to 750 psig. The individual catalyst components are manually batch diluted to specified component concentrations with purified solvent (Isopar E) and pressurized to a pressure that is above the reaction pressure, approximately from 400 to 750 psig. All reaction feed flows are measured with mass flow meters and independently controlled with computer automated valve control systems.

The continuous solution polymerization reactor system according to the present invention consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically between 15-40° C. by passing the feed stream through a series of heat exchangers. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor it is contacted with water to stop the reaction. In addition, various additives such as anti-oxidants, can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper. The polymer properties are then validated The non-polymer portions removed in the devolatilization step pass through various pieces of equipment which separate most of the ethylene which is removed from the system to a vent destruction unit (it is, however, recycled in manufacturing units). Most of the solvent is recycled back to the reactor after passing through purification beds. This solvent can still have unreacted co-monomer in it that is fortified with fresh co-monomer prior to re-entry to the reactor. This fortification of the co-monomer is an essential part of the product density control method. This recycle solvent can still have some hydrogen which is then fortified with fresh hydrogen to achieve the polymer molecular weight target. A very small amount of solvent leaves the system as a co-product due to solvent carrier in the catalyst streams and a small amount of solvent that is part of commercial grade co-monomers.

INVENTIVE ETHYLENE-BASED POLYMER COMPOSITIONS

Inventive Examples 1-4

Inventive ethylene-based polymer compositions, i.e. Inventive Example 1-4, are prepared according to the above procedure. The process conditions are reported in Table 1 and 1A, Table 2 and 2A. Inventive Examples 1-4 were tested for various properties according to the test methods described below, and these properties are reported in Tables 3-8. Referring to Table 2 and 2A, MMAO is modified methyl aluminoxane; RIBS-2 is bis(hydrogenated tallow alkyl)methyl, tetrakis(pentafluorophenyl)borate(1-)amine; and Zirconium based catalyst is [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

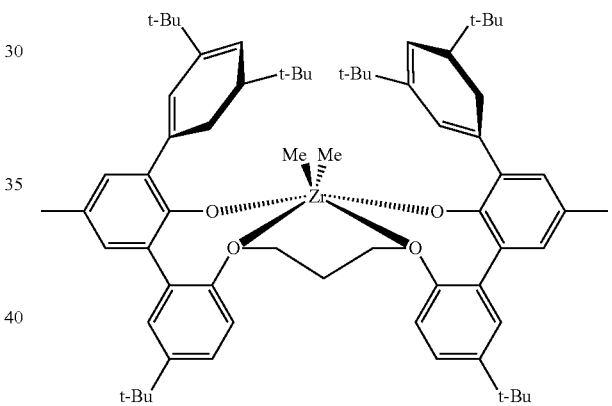

Inventive Example 4 contains 1000 ppm polymer processing aid (PPA)

COMPARATIVE ETHYLENE-BASED COMPOSITIONS

Comparative Examples 1-4

Comparative Example 1 is 50/50 blend of an ethylene/1-hexene copolymer having an $I_2$ of 1 g/10 minutes and density of 0.918 g/cm$^3$, which is available by ExxonMobil Chemical Company under the tradename EXCEED™ 1018, and an ethylene/1-hexene copolymer having an $I_2$ of 3.5 g/10 minutes and density of 0.912 g/cm$^3$, which is available by ExxonMobil Chemical Company under the tradename EXCEED™ 3512.

Comparative Example 2 is an ethylene/1-octene copolymer having $I_2$ of 1 g/10 minutes and density of 0.916 g/cm$^3$, which was provided by The Dow Chemical Company under the tradename ELITE™ 5400G.

Comparative Example 3 is an ethylene/1-octene copolymer having $I_2$ of 1.5 g/10 minutes and density of 0.914 g/cm$^3$, which was provided by The Dow Chemical Company under the tradename ELITE™ 5500.

Comparative Example 4 is an ethylene/1-octene copolymer having $I_2$ of 1.0 g/10 minutes and density of 0.920 g/cm$^3$, which was provided by The Dow Chemical Company under the tradename DOWLEX™ 2045G.

The Comparative Examples 1-3 were tested for various properties according to the test methods described below, and these properties are reported in Tables 3-8.

Comparative Example 4 was tested for various properties according to the test methods described below, and these properties are reported in Tables 17 and 18

Inventive Films 1 and 3

Inventive ethylene-based polymer compositions, Inventive Example 1 and 3 are blown into Inventive Monolayer Films 1 and 3 on a three layer blown film line. The blown film line consists of three groove fed extruders with single flight screws (25:30:25 mm). The length/diameter (L/D) ratio for all screws is 25:1. The blown film line has a 60 mm die with dual lip air ring cooling system, with a screen pack configuration of 20:40:60:80:20 mesh. Inventive Films 1 and 3 are produced at 1 mil thickness. The film fabrication conditions are reported in Table 9. The Inventive Films 1 and 3 are tested for their various properties according to the test methods described below, and these properties are reported in Table 10.

Comparative Films 2 and 3

Comparative ethylene-based polymer compositions, Comparative Example 2 and 3 are blown into Comparative Monolayer Films 2 and 3 on a three layer blown film line. The blown film line consists of three groove fed extruders with single flight screws (25:30:25 mm). The length/diameter (L/D) ratio for all screws is 25:1. The blown film line has a 60 mm die with dual lip air ring cooling system, with a screen pack configuration of 20:40:60:80:20 mesh. Comparative Films 2 and 3 are produced at 1 mil thickness. The film fabrication conditions are reported in Table 9. The Comparative Films 2 and 3 are tested for their various properties according to the test methods described below, and these properties are reported in Table 10.

Inventive Films 4 and Comparative Film 2A

Inventive ethylene-based polymer composition, Inventive Example 4 is blown into Inventive Monolayer Film 4 on a single layer blown film line. Comparative ethylene-based polymer composition, Comparative Example 2 is blown into Comparative Film 2A. Inventive Film 4 and Comparative Film 2A are produced at a 2 mil thickness. The blown film line consists of a single 2.5 inch Davis Standard barrier II screw DSBII. The length/diameter (L/D) ratio for the screw is 30:1. The blown film line has a 6 inch die diameter with a dual lip air ring cooling system and a screen pack configuration of 20:40:60:80:20 mesh Inventive Example 4 contains 1000 ppm PPA in the resin. Referring to Comparative Film 2A, 1000 ppm polymer processing aid (PPA) is added to the resin before extruding the polymeric material into the Comparative Film 2A. The PPA is added as 1.25% of a PPA masterbatch called CKAC-19 made by Ingenia Polymers, which contains 8% of Dynamar FX-5920A in PE carrier, to give the 1000 ppm PPA in the resin.

The film fabrication conditions are reported in Table 9A. Inventive Film 4, Comparative Film 2A tested for their various properties according to the test methods described below, and these properties are reported in Table 10A and 15.

Inventive Blend 1 and Comparative Blend 1

Inventive Blend 1 is a blend of 90% Inventive Example 4 with 10% high pressure low density polyethylene, Dow LDPE 133A, a 0.2 melt index, 0.921 g/cc density LDPE.

Comparative Blend 1 is a blend of 90% Comparative Example 2 and 10% LDPE 133A. In this case, PPA is also added to Comparative blend 1 at 900 ppm so that the amount of PPA is the same as in the Inventive Blend 1. The PPA is added as 1.125% of a PPA masterbatch called CKAC-19 made by Ingenia Polymers, which contains 8% of Dynamar FX-5920A in PE carrier, to give the 900 ppm PPA.

Inventive Blend 1 and Comparative Blend 1 were blown into film on a monolayer blown film line at 2 mil thickness. The blown film line consists of a single 2.5 inch Davis Standard barrier II screw DSBII. The length/diameter (L/D) ratio for the screw is 30:1. The blown film line has a 6 inch die diameter with a dual lip air ring cooling system and a screen pack configuration of 20:40:60:80:20 mesh.

The film fabrication conditions are reported in Table 9A. Inventive Blend 1 and Comparative Blend 1 were tested for their various properties according to the test methods described below, and these properties are reported in Table 10A and 15.

Inventive Three Layer Films A and B

Referring to Tables 11A and B, Inventive Three Layer Films A and B are fabricated according to the following procedure. The Fabrication conditions are reported in Tables 12 and 13.

Inventive Three Layer Film A comprises (1) a sealant layer comprising 96.75 percent by weight of the inventive ethylene-based polymer compositions of Inventive Example 3, 1000 parts per million (ppm) by weight of a slip agent (Erucamide), and 2500 ppm by weight of an antiblocking agent (diamatious earth-antiblock) with the remaining weight being LDPE as the carrier for slip agent and antiblock agent; (2) a core layer comprising 72.1 percent by weight of DOWLEX™ 2045. 11G, an ethylene copolymer (ethylene-octene copolymer) having a density of approximately 0.922 g/cm$^3$ and a melt index (measured at 190° C. and 2.16 kg) of approximately 1.0 g/10 minutes, 25 percent by weight of INSPIRE™ 114, a propylene based polymer having a density of approximately 0.900 g/cm$^3$ and a melt flow rate (measured at 230° C. and 2.16 kg) of approximately 0.50 g/10 minutes, 1200 parts per million (ppm) by weight of a slip agent (Erucamide), and 3000 ppm by weight of an antiblocking agent (diamatious earth-antiblock) with the remaining weight being LDPE as the carrier for slip agent and antiblock agent; (3) a skin layer comprising 96.1 percent by weight of DOWLEX™ 2045. 11G, an ethylene copolymer (ethylene-octene copolymer) having a density of approximately 0.922 g/cm$^3$ and a melt index (measured at 190° C. and 2.16 kg) of approximately 1.0 g/10 minutes, 1200 parts per million (ppm) by weight of a slip agent (Erucamide), and 3000 ppm by weight of an antiblocking agent (diamatious earth-antiblock) with the remaining weight being LDPE as the carrier for slip agent and antiblock agent. Inventive Three Layer Film B comprises (1) a sealant layer comprising 96.75 percent by weight of the inventive ethylene-based polymer compositions of Inventive Example 1, 1000 parts per million (ppm) by weight of a slip agent (Erucamide), and 2500 ppm by weight of an antiblocking agent (diamatious earth-antiblock) with the remaining weight being LDPE as the carrier for slip agent and antiblock agent; (2) a core layer comprising 72.1 percent by weight of DOWLEX™ 2045. 11G, an ethylene copolymer (ethylene-octene copolymer) having a density of approximately 0.922 g/cm$^3$ and a melt index (measured at 190° C. and 2.16 kg) of approximately 1.0 g/10 minutes, 25 percent by weight of INSPIRE™ 114, a propylene based polymer having a density of approximately 0.900 g/cm$^3$ and a melt flow rate (measured at 230° C. and 2.16 kg) of approximately 0.50 g/10 minutes, 1200 parts per million (ppm) by weight of a slip agent (Erucamide), and 3000 ppm by weight of an antiblocking agent (diamatious earth-antiblock) with the remaining weight being LDPE as the carrier for slip agent and antiblock agent; (3) a skin layer comprising 96.1 percent by weight of DOWLEX™ 2045. 11G, an ethylene copolymer (ethylene-octene copolymer) having a density of approximately 0.922 g/cm$^3$ and a melt index (measured at 190° C. and 2.16 kg) of approximately 1.0 g/10 minutes, 1200 parts per million (ppm) by weight of a slip agent (Erucamide), and 3000 ppm by weight of an antiblocking agent (diamatious earth-antiblock) with the remaining weight being LDPE as the carrier for slip agent and antiblock agent The inventive three layer co-extruded films are fabricated on a three layer co-extruded blown film line consisting of two 2.5 inch 24:1 L/D Egan extruders (Extruders A and B) and one 2 inch 24:1 L/D Johnson extruder (Extruder C). All the extruders are smooth bore with barrel heating and cooling (closed loop liquid cooling system). The extruders are powered by 60, 75, and 20 HP DC drivers, respectively. The extruders are controlled by an Extrol 6032 microprocessor. The extrusion process is monitored by Pressure Transducers, three on the 2½" barrels, one before and one after each breaker plate as well as 4 heater zones on each barrel, one each at the adapter and the block and two zones on the die. The Microprocessor also tracks the extruder RPM, % FLC, HP, Rate, Layflat and melt temperature at each extruder. The die is a 6 inch Battenfeld-Gloucester with a layer ratio of 15:75:15% and a 70 mil die gap. The standard screws used are New Castle's single flight high shear screws with a 2.88 compression ratio on Extruder A; Feed Screw's Modified Double mix with a 3.64 compression ratio on Extruder B; and Johnson single flight with a 2.5 compression ratio on Extruder C. Co-extruded film structure of 2.5 mil film (1.0 mil sealant/1.0 mil core/0.5 mil skin layer), slit to 21.5", cut flush with core, was produced at a 2.5:1 BUR. The screen pack configuration was 20:40:60:80:20 mesh.

Inventive Three Layer Films A and B are evaluated on a Weigh Pack Systems XPDIUS ELITE series VFS bagger, and the results are shown in Table 14. The Weigh Pack VFFS packaging equipment used poly sealing jaws: false jaws+seal jaws, where the seal jaws back is concave and the front is jaw is convex. The catch plates are V-shaped just above seal jaws. The jaw strength is set at 180 units, based on the servo motor. The fin seal jaw is set at 50 psi dwell pressure.

Bags are tested using 2 lbs of measured dry red beans as the fill product. Pre-measured 2 lbs amounts of dry red beans are poured by hand into the VFFS bags via the forming collar. Products are evaluated for minimum seal temperature and minimum dwell time, two critical parameters for maximization of VFFS production rate. The minimum seal temperature is determined by filling the VFFS bags with 2 lbs worth of dried beans at a constant dwell time (1.35 s) and lowering the seal temperature until the VFFS bags would no longer hold the dried beans. To determine the minimum dwell time pillow pouches are made (VFFS bags with no product). The tests are started at 5° C. above the minimum seal temperature required to hold 2 lbs of dried beans. The seal bar dwell time is then shortened until the VFFS bag would no longer hold a seal.

For the minimum seal temperature determination, after the packages are made, they are allowed to "setup" for approximately 30 seconds and then vigorously shook to make sure the content held for the 2 lb bean packages. For the minimum dwell temperature determination the air-filled-only pillow pouches are allowed to setup for approximately 30 second to allow the seal to set-up and then hand pressure is applied to the packages to make sure they would not burst open at the seal or have a large "channel" leaker. A channel leaker is a large hole formed at the point where either of the seals on the ends of the package overlapped with long seal on the long-edge of the package. A hermetic (air-tight) seal is not required for most solid food applications, including frozen foods. The results are reported in Table 14.

Comparative Three Layer Film A

Referring to Table 11 C, Comparative Three Layer Film A is fabricated according to the following procedure. The Fabrication conditions are reported in Tables 12 and 13.

Comparative Three Layer Film A comprises (1) a sealant layer comprising 96.75 percent by weight of ELITE™ 5500G, an ethylene/octene copolymer having a melt index (I$_2$) (measured at 190° C. and 2.16 kg) of approximately 1.5 g/10 minutes and a density of approximately 0.914 g/cm$^3$, 1000 parts per million (ppm) by weight of a slip agent (Erucamide), and 2500 ppm by weight of an antiblocking agent (diamatious earth-antiblock) with the remaining weight being LDPE as the carrier for slip agent and antiblock agent; (2) a core layer comprising 72.1 percent by weight of DOWLEX™ 2045. 11G, an ethylene copolymer (ethylene-octene copolymer) having a density of approximately 0.922 g/cm$^3$ and a melt index (measured at 190° C. and 2.16 kg) of approximately 1.0 g/10 minutes, 25 percent by weight of INSPIRE™ 114, a propylene based polymer having a density of approximately 0.900 g/cm$^3$ and a melt flow rate (measured at 230° C. and 2.16 kg) of approximately 0.50 g/10 minutes, 1200 parts per million (ppm) by weight of a slip agent (Erucamide), and 3000 ppm by weight of an antiblocking agent (diamatious earth-antiblock) with the remaining weight being LDPE as the carrier for slip agent and antiblock agent; (3) a skin layer comprising 96.1 percent by weight of DOWLEX™ 2045. 11G, an ethylene copolymer (ethylene-octene copolymer) having a density of approximately 0.922 g/cm$^3$ and a melt index (measured at 190° C. and 2.16 kg) of approximately 1.0 g/10 minutes, 1200 parts per million (ppm) by weight of a slip agent (Erucamide), and 3000 ppm by weight of an antiblocking agent (diamatious earth-antiblock) with the remaining weight being LDPE as the carrier for slip agent and antiblock agent.

Comparative Three Layer Film A is fabricated on a three layer co-extruded blown film line consisting of two 2.5 inch 24:1 L/D Egan extruders (Extruders A and B) and one 2 inch 24:1 L/D Johnson extruder (Extruder C). All the extruders are smooth bore with barrel heating and cooling (closed loop liquid cooling system). The extruders are powered by 60, 75, and 20 HP DC drivers, respectively. The extruders are controlled by an Extrol 6032 microprocessor. The extrusion process is monitored by Pressure Transducers, three on the 2½" barrels, one before and one after each breaker plate as well as 4 heater zones on each barrel, one each at the adapter and the block and two zones on the die. The Microprocessor also tracks the extruder RPM, % FLC, HP, Rate, Layflat and melt temperature at each extruder. The die is a 6 inch Battenfeld- Gloucester with a layer ratio of 15:75:15% and a 70 mil die gap. The standard screws used are New Castle's single flight high shear screws with a 2.88 compression ratio on Extruder A; Feed Screw's Modified Double mix with a 3.64 compression ratio on Extruder B; and Johnson single flight with a 2.5 compression ratio on Extruder C. Co-extruded film structure of 2.5 mil film (1.0 mil sealant/1.0 mil core/0.5 mil skin layer), slit to 21.5", cut flush with core, was produced at a 2.5:1 BUR. The screen pack configuration was 20:40:60:80:20 mesh.

Comparative Three Layer Film A is evaluated on a Weigh Pack Systems XPDIUS ELITE series VFS bagger. The Weigh Pack VFFS packaging equipment used poly sealing jaws: false jaws+seal jaws, where the seal jaws back is concave and the front is jaw is convex. The catch plates are V-shaped just above seal jaws. The jaw strength is set at 180 units, based on the servo motor. The fin seal jaw is set at 50 psi dwell pressure.

Bags are tested using 2 lbs of measured dry red beans as the fill product. Pre-measured 2 lbs amounts of dry red beans are poured by hand into the VFFS bags via the forming collar. Products are evaluated for minimum seal temperature and minimum dwell time, two critical parameters for maximization of VFFS production rate. The minimum seal temperature is determined by filling the VFFS bags with 2 lbs worth of dried beans at a constant dwell time (1.35 s) and lowering the seal temperature until the VFFS bags would no longer hold the dried beans. To determine the minimum dwell time pillow pouches are made (VFFS bags with no product). The tests are started at 5° C. above the minimum seal temperature required to hold 2 lbs of dried beans. The seal bar dwell time is then shortened until the VFFS bag would no longer hold a seal.

For the minimum seal temperature determination, after the packages are made, they are allowed to "setup" for approximately 30 seconds and then vigorously shook to make sure the content held for the 2 lb bean packages. For the minimum dwell temperature determination the air-filled-only pillow pouches are allowed to setup for approximately 30 second to allow the seal to set-up and then hand pressure is applied to the packages to make sure they would not burst open at the seal or have a large "channel" leaker. A channel leaker is a large hole formed at the point where either of the seals on the ends of the package overlapped with long seal on the long-edge of the package. A hermetic (air-tight) seal is not required for most solid food applications, including frozen foods. The results are reported in Table 14.

Inventive Blends 2 and 3

Inventive Blend 2 is a blend of 80% Inventive Example 4 with 20% high pressure low density polyethylene, Dow LDPE 501I, having an $I_2$ of 1.9 g/10 minutes and a density of 0.922 g/cc.

Inventive Blend 3 is a blend of 70% Inventive Example 4 with 30% high pressure low density polyethylene, Dow LDPE 501I, having an $I_2$ of 1.9 g/10 minutes and a density of 0.922 g/cc.

Inventive Blends 2 and 3 are produced on a monolayer blown film line at a 2 mil thickness. The blown film line consists of a single 2.5 inch Davis Standard barrier II screw DSBII. The length/diameter (L/D) ratio for the screw is 30:1. The blown film line has a 6 inch die diameter with a dual lip air ring cooling system and a screen pack configuration of 20:40:60:80:20 mesh. The film fabrication conditions are reported in Table 16. Inventive Blend 1 and Comparative Blend 1 were tested for their various properties according to the test methods described below, and these properties are reported in Table 17 and 18.

Comparative Blends 2 and 3

Comparative Blend 2 is a blend of 80% Comparative Example 4 with 20% high pressure low density polyethylene, Dow LDPE 501I, having an $I_2$ of 1.9 g/10 minutes and a density of 0.922 g/cc.

Comparative Blend 3 is a blend of 70% Comparative Example 4 with 30% high pressure low density polyethylene, Dow LDPE 501I, having an $I_2$ of 1.9 g/10 minutes and a density of 0.922 g/cc.

Comparative Blends 2 and 3 are produced on a monolayer blown film line at a 2 mil thickness. The blown film line consists of a single 2.5 inch Davis Standard barrier II screw DSBII. The length/diameter (L/D) ratio for the screw is 30:1. The blown film line has a 6 inch die diameter with a dual lip air ring cooling system and a screen pack configuration of 20:40:60:80:20 mesh. The film fabrication conditions are reported in Table 16. Comparative Blend 2 and Comparative Blend 3 were tested for their various properties according to the test methods described below, and these properties are reported in Table 17 and 18.

TABLE 1

|  | Units | Inventive Example 1 | Inventive Example 2 | Inventive Example 3 |
|---|---|---|---|---|
| Primary Reactor Feed Temperature | ° C. | 20 | 20 | 20 |
| Primary Reactor Total Solvent Flow | lbs/hr | 1,161 | 1,160 | 1159 |
| Primary Reactor Total Ethylene Flow | lbs/hr | 178 | 199 | 220 |
| Primary Reactor Total Comonomer Flow | lbs/hr | 76 | 15 | 92 |
| Primary Reactor Feed Solvent/Ethylene Ratio | — | 6.9 | 6.9 | 5.5 |
| Primary Reactor Fresh Hydrogen Flow | Standard cm$^3$/minute | 3,383 | 701 | 6,485 |
| Secondary Reactor Feed Temperature | ° C. | 21 | 32 | 20 |
| Secondary Reactor Total Solvent Flow | lbs/hr | 510 | 340 | 400 |
| Secondary Reactor Total Ethylene Flow | lbs/hr | 196 | 127 | 153 |
| Secondary Reactor Total Comonomer Flow | lbs/hr | 13.5 | 1.8 | 16.1 |
| Secondary Reactor Feed Solvent/Ethylene Ratio | — | 2.7 | 2.8 | 2.7 |
| Secondary Reactor Fresh Hydrogen Flow | Standard cm$^3$/minute | 4,990 | 21,857 | 2,047 |
| Primary Reactor Control Temperature | ° C. | 140 | 180 | 155 |
| Primary Reactor Pressure | psig | 725 | 725 | 725 |
| Primary Reactor Ethylene Conversion | % | 92 | 91 | 81 |
| Primary Reactor Percent Solids | % | 16 | 13 | 16 |
| Secondary Reactor Heat Transfer Coefficient | BTU/hr ft$^3$ ° F. | 6.7 | 9.1 | 7.6 |

TABLE 1-continued

|  | Units | Inventive Example 1 | Inventive Example 2 | Inventive Example 3 |
|---|---|---|---|---|
| Primary Reactor Polymer Residence Time | hrs | 0.27 | 0.29 | 0.25 |
| Secondary Reactor Control Temperature | °C. | 190 | 190 | 190 |
| Secondary Reactor Pressure | psig | 731 | 730 | 729 |
| Secondary Reactor Ethylene Conversion | % | 87 | 85 | 87 |
| Secondary Reactor Percent Solids | % | 21 | 17 | 22 |
| Secondary Reactor Heat Transfer Coefficient | BTU/hr ft$^3$ °F. | 51 | 44 |  |
| Secondary Reactor Polymer Residence Time | hrs | 0.10 | 0.12 |  |
| Primary Reactor Split | % | 50 | 56 |  |
| Primary Reactor Production Rate | lbs/hr | 212 | 160 |  |
| Secondary Reactor Production Rate | lbs/hr | 215 | 127 | 201 |
| Total Production Rate from MB | lbs/hr | 426 | 287 | 427 |
| Primary Reactor Catalyst Efficiency | 10$^6$ Lbs | 8.6 | 2.3 | 10.9 |
| Secondary Reactor Catalyst Efficiency | 10$^6$ Lbs | 1.6 | 1.1 | 1.4 |

TABLE 1A

|  | Units | Inventive Example 4 |
|---|---|---|
| Primary Reactor Feed Temperature | °C. | 13.1 |
| Primary Reactor Total Solvent Flow | klbs/hr | 137.4 |
| Primary Reactor Total Ethylene Flow | klbs/hr | 25 |
| Primary Reactor Total Comonomer Flow | klbs/hr | 9.3 |
| Primary Reactor Feed Solvent/Ethylene Ratio | — | 5.3 |
| Primary Reactor Fresh Hydrogen Flow | lb/hr | 6.7 |
| Secondary Reactor Feed Temperature | °C. | 10.8 |
| Secondary Reactor Total Solvent Flow | klbs/hr | 54.8 |
| Secondary Reactor Total Ethylene Flow | kT/hr | 21.4 |
| Secondary Reactor Total Comonomer Flow | klbs/hr | 1.7 |
| Secondary Reactor Feed Solvent/Ethylene Ratio | — | 2.6 |
| Secondary Reactor Fresh Hydrogen Flow | lbs/hr | 2.2 |
| Primary Reactor Control Temperature | °C. | 150 |
| Primary Reactor Pressure | psig | 500 |
| Primary Reactor Ethylene Conversion | wt % | 85 |
| Primary Reactor Percent Solids | wt % | 15.2 |
| Secondary Reactor Heat Transfer Coefficient | BTU/hr ft$^3$ °F. | N/A |
| Primary Reactor Polymer Residence Time | min | 11.6 |
| Secondary Reactor Control Temperature | °C. | 190 |
| Secondary Reactor Pressure | psig | 500 |
| Secondary Reactor Ethylene Conversion | wt % | 87 |
| Secondary Reactor Percent Solids | wt % | 20.8 |
| Secondary Reactor Heat Transfer Coefficient | BTU/hr ft$^3$ °F. | 41 |
| Secondary Reactor Polymer Residence Time | min | 7.7 |
| Primary Reactor Split | wt % | 49.4 |

TABLE 2

|  | Units | Inventive Example 1 | Inventive Example 2 | Inventive Example 3 |
|---|---|---|---|---|
| Primary Reactor Catalyst Flow | lbs/hr | 1.81 | 1.962134 | 1.52 |
| Primary Reactor Catalyst Concentration | ppm | 13.67 | 34.95987 | 13.67 |
| Primary Reactor Catalyst Efficiency | 10$^6$ lbs | 8.56 | 2.309096 | 10.87 |
| Primary Reactor Catalyst- Type 1 | — | Zirconium Based Catalyst | Zirconium Based Catalyst | Zirconium Based Catalyst |
| Primary Reactor Catalyst - 1 Flow | lbs/hr | 1.81 | 1.96 | 1.52 |
| Primary Reactor Catalyst - 1 Concentration | ppm | 13.67 | 34.96 | 13.67 |
| Primary Reactor Catalyst - 1 | Mole Weight | ~91 | ~91 | ~91 |
| Primary Reactor Co-Catalyst - 1 | Molar Ratio | 1.48 | 1.42 | 1.77 |
| Primary Reactor Co-Catalyst- 1 Type | — | MMAO | MMAO | MMAO |
| Primary Reactor Co-Catalyst- 1 Flow | lbs/hr | 0.81 | 1.19 | 0.81 |
| Primary Reactor Co-Catalyst- 1 Concentration | ppm | 596 | 1,094 | 596 |
| Primary Reactor Co-Catalyst - 2 | Molar Ratio | 6.91 | 6.97 | 7.11 |
| Primary Reactor Co-Catalyst- 2 Type | — | RIBS-2 | RIBS-2 | RIBS-2 |
| Primary Reactor Co-Catalyst- 2 Flow | lbs/hr | 0.52 | 0.72 | 0.44 |
| Primary Reactor Co-Catalyst- 2 Concentration | ppm | 99.6 | 199 | 99.6 |
| Secondary Reactor Catalyst Type | — | Zirconium Based Catalyst | Zirconium Based Catalyst | Zirconium Based Catalyst |
| Secondary Reactor Catalyst Flow | lbs/hr | 2.30 | 1.54 | 3.52 |
| Secondary Reactor Catalyst Concentration | ppm | 60 | 76 | 40 |
| Secondary Reactor Catalyst Efficiency | 10$^6$ lbs | 1.56 | 1.08 | 1.43 |
| Secondary Reactor Co-Catalyst - 1 | Molar Ratio | 1.50 | 1.21 | 1.48 |
| Secondary Reactor Co-Catalyst- 1 Type | — | MMAO | MMAO | MMAO |
| Secondary Reactor Co-Catalyst- 1 Flow | lbs/hr | 4.59 | 1.68 | 4.62 |
| Secondary Reactor Co-Catalyst - 2 | Molar Ratio | 7.02 | 6.96 | 6.99 |

TABLE 2-continued

|  | Units | Inventive Example 1 | Inventive Example 2 | Inventive Example 3 |
|---|---|---|---|---|
| Secondary Reactor Co-Catalyst- 2 Type | — | RIBS-2 | RIBS-2 | RIBS-2 |
| Secondary Reactor Co-Catalyst- 2 Flow | lbs/hr | 2.88 | 1.22 | 2.93 |
| Secondary Reactor Co-Catalyst- 2 Concentration | ppm | 100 | 199 | 100 |

TABLE 2A

|  | Units | Inventive Example 4 |
|---|---|---|
| Primary Reactor Catalyst Flow | lbs/hr | 5.8 |
| Primary Reactor Catalyst Concentration | wt % Zirconium Based Catalyst | 0.25 |
| Primary Reactor Catalyst- Type 1 | — | Zirconium Based Catalyst |
| Primary Reactor Catalyst - 1 | Mole Weight | ~91 |
| Primary Reactor Co-Catalyst - 1 | Molar Ratio | 15.1 |
| Primary Reactor Co-Catalyst- 1 Type | — | MMAO |
| Primary Reactor Co-Catalyst- 1 Flow | lbs/hr | 4.6 |
| Primary Reactor Co-Catalyst- 1 Concentration | wt %/Al | 0.12 |
| Primary Reactor Co-Catalyst - 2 | Molar Ratio | 1.2 |
| Primary Reactor Co-Catalyst- 2 Type | — | RIBS-2 |
| Primary Reactor Co-Catalyst- 2 Flow | lbs/hr | 4.0 |
| Primary Reactor Co-Catalyst- 2 Concentration | wt % Co-Catalyst-2 | 0.5 |
| Secondary Reactor Catalyst Type | — | Zirconium Based Catalyst |
| Secondary Reactor Catalyst Flow | lbs/hr | 59.6 |
| Secondary Reactor Catalyst Concentration | wt % Zirconium Based Catalyst | 0.25 |
| Secondary Reactor Co-Catalyst - 1 | Molar Ratio | 5.5 |
| Secondary Reactor Co-Catalyst- 1 Type | — | MMAO |
| Secondary Reactor Co-Catalyst- 1 Flow | lbs/hr | 17.1 |
| Secondary Reactor Co-Catalyst - 2 | Molar Ratio | 1.2 |
| Secondary Reactor Co-Catalyst- 2 Type | — | RIBS-2 |
| Secondary Reactor Co-Catalyst- 2 Flow | lbs/hr | 11.4 |
| Secondary Reactor Co-Catalyst- 2 Concentration | wt % Co-Catalyst-2 | 1.8 |

TABLE 3

|  | Density(g/cc) | $I_{10}$ (g/10 min) | $I_2$ (g/10 min) | $I_{10}/I_2$ |
|---|---|---|---|---|
| Inventive Example 1 | 0.912 | 11.5 | 1.5 | 7.7 |
| Inventive Example 2 | 0.937 | 7.1 | 0.4 | 16.1 |
| Inventive Example 3 | 0.912 | 11.5 | 1.6 | 7.4 |
| Inventive Example 4 | 0.916 | 8.0 | 1.0 | 8.0 |
| Comparative Example 1 | 0.916 | 9.1 | 1.6 | 5.9 |
| Comparative Example 2 | 0.916 | 8.5 | 1.0 | 8.4 |
| Comparative Example 3 | 0.914 | 11.2 | 1.5 | 7.3 |

TABLE 4

| | Unsaturation Unit/1,000,000 C | | | | |
|---|---|---|---|---|---|
|  | vinylene | trisubstituted | vinyl | vinylidene | Total |
| Inventive Example 1 | 6 | 2 | 47 | 7 | 62 |
| Inventive Example 2 | 5 | 1 | 59 | 6 | 71 |
| Inventive Example 3 | 9 | 2 | 55 | 12 | 78 |
| Inventive Example 4 | 6 | 4 | 55 | 8 | 73 |
| Comparative Example 1 | 21 | 46 | 54 | 24 | 145 |
| Comparative Example 2 | 52 | 51 | 171 | 40 | 314 |
| Comparative Example 3 | 41 | 32 | 149 | 30 | 252 |

TABLE 5

|  | Comonomer Distribution Index | Stdev, C | Half Width | Half Width/ Stdev | CDC (Comonomer Distribution Constant) |
|---|---|---|---|---|---|
| Inventive Example 1 | 0.873 | 12.301 | 16.823 | 1.368 | 63.8 |
| Inventive Example 2 | 0.838 | 6.250 | 3.721 | 0.595 | 140.9 |
| Inventive Example 3 | 0.802 | 11.003 | 5.788 | 0.526 | 152.4 |
| Inventive Example 4 | 0.9298 | 5.272 | 4.958 | 0.94 | 98.9 |
| Comparative Example 1 | 0.662 | 10.508 | 25.270 | 2.405 | 27.5 |
| Comparative Example 2 | 0.515 | 18.448 | 36.739 | 1.991 | 25.9 |
| Comparative Example 3 | 0.246 | 27.884 | 42.670 | 1.530 | 16.1 |

TABLE 6

|  | Cool Curve Data | | Heat Curve Data | |
|---|---|---|---|---|
|  | $T_c$ (° C.) | ΔH of Crystallization (J/g) | $T_m$ (° C.) | ΔH of melting (J/g) |
| Inventive Example 1 | 95.21 | 130.7 | 110.82 | 132.2 |
| Inventive Example 2 | 112.97 | 179.6 | 123.79 | 178.4 |
| Inventive Example 3 | 93.97 | 130.4 | 108.33 | 131.7 |
| Inventive Example 4 | 96.9 | 135.2 | 110.6 | 136 |
| Comparative Example 1 | 103.92 | 126.7 | 117.55 | 129.5 |
| Comparative Example 2 | 105.1 | 141.6 | 123.63 | 143 |
| Comparative Example 3 | 106.55 | 137.5 | 124 | 137.4 |

TABLE 7

| Identification | Test Method | Mn | Mw | Mz | Mw/Mn |
|---|---|---|---|---|---|
| Inventive Example 1 | Conventional GPC | 32,370 | 86,200 | 170,500 | 2.7 |
| Inventive Example 2 | Conventional GPC | 14,630 | 103,100 | 282,600 | 7.0 |
| Inventive Example 3 | Conventional GPC | 33,750 | 84,080 | 159,600 | 2.5 |
| Inventive Example 4 | Conventional GPC | 35,122 | 94,162 | 216,572 | 2.7 |
| Comparative Example 1 | Conventional GPC | 36,780 | 95,950 | 174,500 | 2.6 |
| Comparative Example 2 | Conventional GPC | 24,600 | 101,900 | 238,200 | 4.1 |
| Comparative Example 3 | Conventional GPC | 28,800 | 105,100 | 374,900 | 3.6 |

TABLE 8

| | Shear Rate (1/sec) @ 190° C. | | | | | | | | | | | |
|---|---|---|---|---|---|---|---|---|---|---|---|---|
| | G' (Pa) | | | | G'' (Pa) | | | | Eta* (Pa-s) | | | |
| | 0.1 | 1 | 10 | 100 | 0.1 | 1 | 10 | 100 | 0.1 | 1 | 10 | 100 |
| Inventive Example 1 | 66 | 1,221 | 12,621 | 85,376 | 620 | 4,696 | 27,476 | 102,830 | 6,240 | 4,825 | 3,024 | 1,337 |
| Inventive Example 2 | 1,764 | 7,855 | 30,375 | 111,000 | 2,756 | 9,716 | 33,986 | 87,314 | 32,724 | 12,494 | 4,558 | 1,412 |
| Inventive Example 3 | 52 | 1,054 | 11,539 | 84,139 | 569 | 4,411 | 26,910 | 103,850 | 5,716 | 4,535 | 2,928 | 1,337 |
| Inventive Example 4 | 141 | 1,977 | 17,266 | 109,970 | 913 | 6,295 | 34,450 | 123,590 | 9,240 | 6,598 | 3,853 | 1,654 |
| Comparative Example 1 | 8 | 270 | 8,214 | 97,443 | 378 | 3,670 | 29,450 | 128,860 | 3,781 | 3,679 | 3,057 | 1,616 |
| Comparative Example 2 | 199 | 2,134 | 18,203 | 102,500 | 957 | 6,275 | 32,869 | 104,710 | 9,775 | 6,628 | 3,757 | 1,465 |
| Comparative Example 3 | 34 | 892 | 11,631 | 86,949 | 529 | 4,404 | 27,610 | 104,400 | 5,296 | 4,493 | 2,996 | 1,359 |

TABLE 9A

| Parameter | Inventive Film 4 | Comparative Film 2A | Inventive Blend 1 | Comparative Blend 1 |
|---|---|---|---|---|
| Blow up ratio (BUR) | 2.5 | 2.5 | 2.5 | 2.5 |
| Output (lb/hr) | 155.3 | 155 | 155 | 155 |
| Film Thickness (mil) | 2 | 2 | 2 | 2 |
| Die Gap (mil) | 70 | 70 | 70 | 70 |
| Layflat (in) | 23.5 | 23.5 | 23.5 | 23.5 |
| Air Temperature (° F.) | 45 | 45 | 45 | 46 |
| Temperature Profile (° F.) | | | | |
| Barrel 1 | 374 | 376 | 375 | 375 |
| Barrel 2 | 425 | 425 | 426 | 425 |

TABLE 9

| Parameter | Unit | Inventive Film 1 | | Comparative Film 2 | | Comparative Film 3 | | Inventive Film 3 | |
|---|---|---|---|---|---|---|---|---|---|
| Actual Speed | m/min | 17.3 | | 22.2 | | 17.4 | | 17.3 | |
| Actual Rate | kg/hr | 27.6 | | 10.9 | | 13.2 | | 14.7 | |
| Motor Load | Amp | 6 | | 6 | | 6 | | 6 | |
| Screw Speed | rpm | 50 | | 50 | | 50 | | 50 | |
| Pressure | Bar | 289 | | 306 | | 300 | | 287 | |
| Melt Temperature | ° C. | 186 | | N/A (Instrumentation Failure) | | 185 | | 185 | |
| Layflat Width | cm | 23.8 | | 23.5 | | 23.8 | | 23.8 | |
| Temperature Profile | | Set | Actual | Set | Actual | Set | Actual | Set | Actual |
| Core Barrel 1 | ° C. | 180 | 180 | 170 | 170 | 180 | 180 | 180 | 180 |
| Core Barrel 2 | ° C. | 195 | 196 | 220 | 220 | 195 | 195 | 195 | 194 |
| Core Barrel 3 | ° C. | 190 | 189 | 175 | 175 | 190 | 189 | 190 | 189 |
| Core Barrel 4 | ° C. | 190 | 189 | 175 | 175 | 190 | 191 | 190 | 191 |
| Adapter Temperature | ° C. | 210 | 210 | 225 | 225 | 210 | 210 | 210 | 210 |
| Tube | ° C. | 210 | 210 | 225 | 225 | 210 | 210 | 210 | 210 |
| Die Temperature 5 | ° C. | 210 | 210 | 225 | 225 | 210 | 210 | 210 | 210 |
| Die Temperature 4 | ° C. | 210 | 210 | 225 | 225 | 210 | 210 | 210 | 210 |
| Die Temperature 3 | ° C. | 210 | 210 | 225 | 225 | 210 | 210 | 210 | 210 |
| Die Temperature 2 | ° C. | 210 | 210 | 225 | 226 | 210 | 210 | 210 | 210 |
| Die Temperature 1 | ° C. | 210 | 210 | 225 | 225 | 210 | 210 | 210 | 210 |
| Die Gap | mil | 2 | | 2 | | 2 | | 2 | |
| Frost Line | inch | 7 | | 7 | | 7 | | 7 | |
| BUR | | 2.5 | | 2.5 | | 2.5 | | 2.5 | |

TABLE 9A-continued

| Parameter | Inventive Film 4 | Comparative Film 2A | Inventive Blend 1 | Comparative Blend 1 |
| --- | --- | --- | --- | --- |
| Barrel 3 | 350 | 349 | 351 | 350 |
| Barrel 4 | 350 | 349 | 351 | 350 |
| Barrel 5 | 351 | 350 | 351 | 349 |
| Screen | 441 | 439 | 440 | 440 |
| Adapter | 440 | 441 | 441 | 442 |
| Rotator | 431 | 452 | 433 | 443 |
| Lower Die | 441 | 441 | 439 | 440 |
| Upper Die | 439 | 440 | 438 | 440 |
| Melt Temperature | 453 | 440 | 449 | 442 |

TABLE 10

| | Inventive Film 1 | Inventive Film 3 | Comparative Film 2 | Comparative Film 3 |
| --- | --- | --- | --- | --- |
| Gloss 45 deg (%) | 76 | 83 | 78 | 91 |
| Haze- Film (%) | 7 | 5 | 6 | 4 |
| Haze Internal (%) | 0.6 | 0.5 | 1.3 | 1.3 |
| Dart A (g) | 850 | 850 | 850 | 703 |
| Dart B (g) | 580 | 676 | 666 | — |
| Elmendorf Tear MD Normalized (g/mil) | 334 | 378 | 256 | 376 |
| Elmendorf Tear CD Normalized (g/mil) | 465 | 521 | 535 | 614 |
| Puncture (ft * lbf/in$^3$) | 237 | 342 | 399 | 146 |
| Tensile -CD- Break Stress (psi) | 6,336 | 6,811 | 7,039 | 6,419 |
| Tensile- CD- Energy to Break (in * lbf) | 32 | 34 | 33 | 34 |
| Tensile- CD- Strain to Break (%) | 641 | 670 | 678 | 666 |
| Tensile- CD- Stress at Yield (psi) | 1,419 | 1,404 | 1,595 | 1,477 |
| Tensile -MD- Break Stress (psi) | 6,830 | 7,417 | 7,320 | 7,046 |
| Tensile- MD- Energy to Break (in * lbf) | 26 | 28 | 24 | 30 |
| Tensile- MD- Strain to Break (%) | 476 | 506 | 436 | 525 |
| Tensile- MD- Stress at Yield (psi) | 1,713 | 1,684 | 1,607 | 1,654 |

TABLE 10A

| | Inventive Film 4 | Comparative Film 2A | Inventive Blend 1 | Comparative Blend 1 |
| --- | --- | --- | --- | --- |
| Average Thickness (mil) | 2.04 | 2.11 | 2.05 | 2.1 |
| Dart A (g) | 850 | 850 | 850 | 850 |
| Dart B (g) | 972 | 1,080 | — | 772 |
| Puncture (ft-lb/in$^3$) | 286 | 320 | 272 | 288 |
| Puncture Modified (ft-lb/in$^3$) | 68 | 88 | 81 | 80 |
| MD Tear Type B (g) | 608 | 625 | 477 | 543 |
| CD Tear Type B (g) | 947 | 1,069 | 1,171 | 1,273 |
| MD 2% Secant Modulus (psi) | 20,791 | 22,931 | 21,533 | 23,836 |
| CD 2% Secant Modulus (psi) | 21,643 | 26,071 | 23,894 | 26,578 |
| MD Break stress (psi) | 7,343 | 6,282 | 7,165 | 6,360 |
| MD Peak Load (lbf) | 15 | 13 | 14 | 13 |
| MD Strain at Break (%) | 585 | 557 | 575 | 562 |
| MD Strain at Yield (%) | 14 | 17 | 16 | 16 |
| MD Stress at Yield (psi) | 1,393 | 1,427 | 1,535 | 1,495 |
| CD Break Stress (psi) | 6,355 | 5,874 | 5,796 | 5,662 |
| CD Peak Load (lbf) | 12 | 12 | 11 | 11 |
| CD Strain at Break (%) | 630 | 641 | 636 | 643 |
| CD Strain at Yield (%) | 13 | 25 | 16 | 14 |
| CD Stress at Yield (psi) | 1,393 | 1,476 | 1,451 | 1,507 |

TABLE 11A

| Inventive Three Layer Film A | | | | | | |
| --- | --- | --- | --- | --- | --- | --- |
| For Sealant Layer | Inventive Example 3 + Slip Agent + Antiblock Agent | 96.75 wt % Inventive Example 3 | 2.0 wt % Slip Agent (LDPE based) | 1.25 wt % Antiblock Agent (LDPE based) | 1000 ppm Slip Agent in Sealant Layer | 2500 ppm Antiblock in Sealant Layer |
| For Skin Layer | DOWLEX 2045.11G + Slip Agent + Antiblock Agent | 96.1 wt % DOWLEX 2045.11G | 2.4 wt % Slip Agent (LDPE based) | 1.5 wt % Antiblock Agent (LDPE based) | 1200 ppm Slip Agent in Skin Layer | 3000 ppm Antiblock in Skin Layer |
| For Core Layer | DOWLEX 2045.11G + 25 wt % INSPIRE 114 PP + Slip Agent + Antiblock Agent | 72.1 wt % DOWLEX 2045.11G | 2.4 wt % Slip Agent (LDPE based) | 1.5 wt % Antiblock Agent (LDPE based) | 1200 ppm Slip Agent in Core Layer | 3000 ppm Antiblock in Core Layer |

TABLE 11B

| Inventive Three Layer Film B | | | | | | |
| --- | --- | --- | --- | --- | --- | --- |
| For Sealant Layer | Inventive Example 1 + Slip Agent + Antiblock Agent | 96.75 wt % Inventive Example 1 | 2.0 wt % Slip Agent (LDPE based) | 1.25 wt % Antiblock Agent (LDPE based) | 1000 ppm Slip Agent in Sealant Layer | 2500 ppm Antiblock in Sealant Layer |

TABLE 11B-continued

Inventive Three Layer Film B

| | | | | | | |
|---|---|---|---|---|---|---|
| For Skin Layer | DOWLEX 2045.11G + Slip Agent + Antiblock Agent | 96.1 wt % DOWLEX 2045.11G | 2.4 wt % Slip Agent (LDPE based) | 1.5 wt % Antiblock Agent (LDPE based) | 1200 ppm Slip Agent in Skin Layer | 3000 ppm Antiblock in Skin Layer |
| For Core Layer | DOWLEX 2045.11G + 25 wt % INSPIRE 114 PP + Slip Agent + Antiblock Agent | 72.1 wt % DOWLEX 2045.11G | 2.4 wt % Slip Agent (LDPE based) | 1.5 wt % Antiblock Agent (LDPE based) | 1200 ppm Slip Agent in Core Layer | 3000 ppm Antiblock in Core Layer |

TABLE 11C

Comparative Three Layer Film A

| | | | | | | |
|---|---|---|---|---|---|---|
| For Sealant Layer | Comparative Example 3 + Slip Agent + Antiblock Agent | 96.75 wt % ELITE 5500G | 2.0 wt % Slip Agent (LDPE based) | 1.25 wt % Antiblock (LDPE based) | 1000 ppm Slip Agent in Sealant Layer | 2500 ppm Antiblock in Sealant Layer |
| For Skin Layer | DOWLEX 2045.11G + Slip Agent + Antiblock Agent | 96.1 wt % DOWLEX 2045.11G | 2.4 wt % Slip Agent (LDPE based) | 1.5 wt % Antiblock Agent (LDPE based) | 1200 ppm Slip Agent in Skin Layer | 3000 ppm Antiblock in Skin Layer |
| For Core Layer | DOWLEX 2045.11G + 25 wt % INSPIRE 114 PP + Slip Agent + Antiblock Agent | 72.1 wt % DOWLEX 2045.11G | 2.4 wt % Slip Agent (LDPE based) | 1.5 wt % Antiblock Agent (LDPE based) | 1200 ppm Slip Agent in Core Layer | 3000 ppm Antiblock in Core Layer |

TABLE 12

Inventive Three Layer Film A

| Parameter | Unit | Sealant Layer | Core Layer | Skin Layer |
|---|---|---|---|---|
| Actual Speed | RPM | 47.2 | 48.1 | 29.5 |
| Actual Rate | lb/hr | 63.6 | 64 | 32.4 |
| Layer Ratio | % | 40 | 40 | 20 |
| % FLC | | 56.9 | 37.1 | 15.3 |
| HP | | 13 | 7 | 2 |
| Pressure 1 | psi | — | 1,060 | — |
| Pressure 2 | psi | 2,050 | 1,230 | — |
| Pressure 3 | psi | 5,780 | 2,700 | — |
| Screen Pressure | psi | 5,310 | — | 4,200 |
| Adaptor Pressure | psi | 4,170 | 2,480 | 3,500 |
| Melt Temperature | °F. | 422 | 425 | 414 |
| Layflat Width | cm | 60 | 60 | 60 |

| | | Layer A | | Layer B | | Layer C | |
|---|---|---|---|---|---|---|---|
| Temperature Profile | | Set | Actual | Set | Actual | Set | Actual |
| Barrel 1 | °F. | 375 | 375 | 375 | 375 | 375 | 377 |
| Barrel 2 | °F. | 425 | 425 | 425 | 425 | 425 | 426 |
| Barrel 3 | °F. | 380 | 380 | 380 | 383 | 400 | 400 |
| Barrel 4 | °F. | 380 | 377 | 380 | 381 | 400 | 400 |
| Adapter | °F. | 400 | 400 | 400 | 400 | 420 | 420 |
| Block | °F. | | | 450 | 446 | | |
| Lower Die | °F. | | | 450 | 450 | | |
| Upper Die | °F. | | | 450 | 450 | | |
| Inner Die | | | | 450 | 450 | | |
| External Air Temp | °C. | | | 45 | 45 | | |

TABLE 12-continued

| | | | |
|---|---|---|---|
| Internal Air Temp | °C. | 45 | 75 |
| Die Gap | mil | 70 | |
| Overall Speed | RPM | 53.6 | |
| Overall Rate | lb/hr | 160 | |
| BUR | | 2.5 | |

TABLE 13

| | | Inventive Three Layer Film B | | | Comparative Three Layer Film A | | |
|---|---|---|---|---|---|---|---|
| Parameter | Unit | Sealant Layer | Core Layer | Skin Layer | Sealant Layer | Core Layer | Skin Layer |
| Actual Speed | RPM | 48.2 | 47.6 | 29.1 | 50.1 | 48.5 | 29.5 |
| Actual Rate | lb/hr | 64.4 | 64.3 | 32.1 | 63.5 | 64.3 | 32.5 |
| Layer Ratio | % | 40 | 40 | 20 | 40 | 40 | 20 |
| % FLC | | 57.7 | 36.5 | 15.2 | 58.2 | 37.3 | 15.6 |
| HP | | 13 | 7 | 2 | 14 | 7 | 2 |
| Pressure 1 | psi | — | 1,130 | — | — | 1,080 | — |
| Pressure 2 | psi | 2,570 | 1,490 | — | 1,950 | 1,120 | — |
| Pressure 3 | psi | 5,500 | 2,720 | — | 5,750 | 2,750 | — |
| Screen Pressure | psi | 5,460 | — | 4,120 | 5,460 | — | 4,260 |
| Adaptor Pressure | psi | 4,260 | 2,470 | 3,450 | 4,380 | 2,530 | 3,540 |
| Melt Temperature | °F. | 426 | 424 | 415 | 425 | 425 | 413 |
| Layflat Width | cm | 60 | 60 | 60 | 60 | 60 | 60 |

| | | Layer A | | Layer B | | Layer C | | Layer A | | Layer B | | Layer C | |
|---|---|---|---|---|---|---|---|---|---|---|---|---|---|
| Temperature Profile | | Set | Actual | Set | Actual | Set | Actual | Set | Actual | Set | Actual | Set | Actual |
| Barrel 1 | °F. | 375 | 376 | 375 | 375 | 375 | 374 | 375 | 376 | 375 | 375 | 375 | 374 |
| Barrel 2 | °F. | 425 | 425 | 425 | 426 | 425 | 425 | 425 | 425 | 425 | 426 | 425 | 425 |
| Barrel 3 | °F. | 380 | 382 | 380 | 376 | 400 | 400 | 380 | 380 | 380 | 381 | 400 | 400 |
| Barrel 4 | °F. | 380 | 385 | 380 | 383 | 400 | 400 | 380 | 385 | 380 | 381 | 400 | 400 |
| Adapter | °F. | 400 | 400 | 400 | 399 | 420 | 420 | 400 | 400 | 400 | 400 | 420 | 421 |
| Block | °F. | | | 450 | 448 | | | | | 450 | 447 | | |
| Lower Die | °F. | | | 450 | 450 | | | | | 450 | 450 | | |
| Upper Die | °F. | | | 450 | 450 | | | | | 450 | 450 | | |
| Inner Die | | | | 450 | 450 | | | | | 450 | 451 | | |
| External Air Temp | °C. | | | 45 | 45 | | | | | 45 | 45 | | |
| Internal Air Temp | °C. | | | 45 | 75 | | | | | 45 | 74 | | |
| Die Gap | mil | | | 70 | | | | | | 70 | | | |
| Overall Speed | RPM | | | 50.8 | | | | | | 53.6 | | | |
| Overall Rate | lb/hr | | | 161 | | | | | | 160 | | | |
| BUR | | | | 2.5 | | | | | | 2.5 | | | |

TABLE 14

| | Minimum Seal Temperature 2 lb fill weight/1.35 seconds dwell time | | Minimum dwell time Air fill/Minimum fill temperature | |
|---|---|---|---|---|
| Film | HTIT (°C.) | Dwell Time (s) | HTIT (°C.) | Dwell Time (s) |
| Comparative Three Layer Film A | Fail | Fail | 140 | 2 |
| Inventive Three Layer Film A | 130 | 1.35 | 135 | 1.15 |
| Inventive Three Layer Film B | 135 | 1.35 | 135 | 1.25 |

TABLE 15

| | Comparative Film 2A | Inventive Film 4 | Compartive Blend 1 | Inventive Blend 1 |
|---|---|---|---|---|
| Day 0 | −1.47 | −0.99 | −1.30 | −1.15 |
| Day 1 | −1.02 | −0.84 | −0.96 | −1.04 |
| Day 2 | −0.60 | −0.64 | −0.54 | −0.97 |
| Day 3 | −0.35 | −0.63 | −0.22 | −0.89 |
| Day 4 | −0.25 | −0.51 | 0.17 | −0.87 |
| Day 7 | 0.67 | −0.27 | 1.39 | −0.74 |
| Day 8 | 0.90 | −0.31 | 1.73 | −0.71 |
| Day 9 | 1.30 | −0.37 | 2.08 | −0.71 |
| Day 10 | 1.71 | −0.31 | 2.45 | −0.64 |
| Change (Day 10 − Day 0) | 3.18 | 0.68 | 3.75 | 0.51 |

TABLE 16

| Parameter | Comparative Example 4 | Inventive Example 4 | Comparative Blend 2 | Inventive Blend 2 | Comparative Blend 3 | Inventive Blend 3 |
|---|---|---|---|---|---|---|
| Blow up ratio (BUR) | 2.5 | 2.5 | 2.5 | 2.5 | 2.5 | 2.5 |
| Output (lb/hr) | 187.5 | 188.1 | 187.2 | 188.9 | 187.9 | 187.6 |
| Film Thickness (mil) | 2 | 2 | 2 | 2 | 2 | 2 |
| Die Gap (mil) | 70 | 70 | 70 | 70 | 70 | 70 |
| Layflat (inches) | 23.5 | 23.5 | 23.5 | 23.5 | 23.5 | 23.5 |
| Air Temperature (° F.) | 45 | 45 | 49 | 45 | 46 | 46 |
| Temperature Profile (° F.) | | | | | | |
| Barrel 1 | 375 | 375 | 375 | 375 | 375 | 375 |
| Barrel 2 | 426 | 426 | 425 | 425 | 425 | 425 |
| Barrel 3 | 350 | 351 | 350 | 350 | 350 | 350 |
| Barrel 4 | 350 | 351 | 340 | 350 | 350 | 350 |
| Barrel 5 | 351 | 351 | 340 | 349 | 350 | 350 |
| Screen | 440 | 441 | 440 | 439 | 440 | 440 |
| Adapter | 439 | 442 | 441 | 440 | 441 | 437 |
| Rotator | 451 | 450 | 431 | 432 | 446 | 442 |
| Lower Die | 440 | 438 | 440 | 441 | 440 | 440 |
| Upper Die | 440 | 437 | 440 | 442 | 440 | 440 |
| Melt Temperature | 452 | 464 | 449 | 454 | 445 | 449 |

TABLE 17

| Name | Comparative Example 3 | Inventive Example 4 | Comparative Blend 2 | Inventive Blend 2 | Comparative Blend 3 | Inventive Blend 3 |
|---|---|---|---|---|---|---|
| $I_2$ | 1.00 | 0.87 | 0.95 | 0.89 | 0.93 | 0.85 |
| $I_{10}$ | 7.84 | 7.10 | 8.05 | 8.72 | 8.36 | 7.34 |
| $I_{10}/I_2$ | 7.82 | 8.16 | 8.50 | 9.81 | 9.01 | 8.65 |
| Density (g/cc) | 0.9194 | 0.9161 | 0.9199 | 0.9173 | 0.9213 | 0.9182 |

TABLE 18

| Name | Comparative Example 3 | Inventive Example 4 | Comparative Blend 2 | Inventive Blend 2 | Comparative Blend 3 | Inventive Blend 3 |
|---|---|---|---|---|---|---|
| Haze (%) | 10.5 | 8.2 | 5.6 | 3.9 | 5.3 | 4.6 |
| Haze Internal (%) | 4.7 | 3.3 | 3.4 | 1.4 | 3.0 | 1.5 |
| Gloss 45 Degree | 64.7 | 67.5 | 82.7 | 82.4 | 82.2 | 78.4 |
| Clarity (%) | 97.8 | 98.5 | 99.3 | 98.9 | 98.6 | 97.3 |
| Dart A (g) | 310 | NA | 280 | 487 | 127 | 289 |
| Dart B (g) | NM | 948 | NM | NM | NM | NM |
| Puncture (ft-lb/in$^3$) | 237 | 323 | 224 | 262 | 162 | 230 |
| MD Elmendorf Tear (g) | 903 | 665 | 595 | 501 | 427 | 436 |
| CD Elmendorf Tear (g) | 1,262 | 961 | 1,334 | 1,067 | 1,418 | 1,108 |
| Normalized MD Elmendorf Tear (g/mil) | 445 | 321 | 297 | 247 | 216 | 209 |
| Normalized CD Elmendorf Tear (g/mil) | 609 | 474 | 662 | 522 | 691 | 533 |
| MD 2% Secant Modulus (Psi) | 26,002 | 20,108 | 27,929 | 23,024 | 27,889 | 23,156 |
| CD 2% Secant Modulus (Psi) | 30,537 | 22,011 | 32,372 | 25,730 | 32,129 | 25,890 |
| MD Break Stress (Psi) | 5,672 | 6,990 | 5,700 | 6,008 | 5,427 | 5,883 |
| CD Break Stress (Psi) | 5,918 | 6,448 | 5,721 | 5,497 | 5,318 | 5,483 |
| MD Strain at Break (%) | 622 | 597 | 654 | 604 | 638 | 621 |
| CD Strain at Break (%) | 760 | 663 | 806 | 681 | 832 | 721 |
| MD Strain at Yield (%) | 14.1 | 14.8 | 15.8 | 13.2 | 15.3 | 14.3 |
| CD Strain at Yield (%) | 14.8 | 15.1 | 13.9 | 18.3 | 14.8 | 16.7 |
| MD Stress at Yield (Psi) | 1,581 | 1,376 | 1,664 | 1,476 | 1,718 | 1,538 |
| CD Stress at Yield (Psi) | 1,680 | 1,410 | 1,726 | 1,531 | 1,736 | 1,559 |

TABLE 19

| | ZSVR |
|---|---|
| Comparative Example 1 | 1.3 |
| Comparative Example 2 | 3.1 |
| Comparative Example 3 | 1.3 |
| Inventive Example 1 | 2.4 |
| Inventive Example 2 | 22.1 |
| Inventive Example 3 | 2.6 |
| Inventive Example 4 | 3.4 |

TEST METHODS

Density
Samples that are measured for density are prepared according to ASTM D 1928. Measurements are made within one hour of sample pressing using ASTM D792, Method B.

Melt Index
Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

DSC Crystallinity
Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation 6, shown in FIG. 6

The heat of fusion ($H_f$) and the peak melting temperature are reported from the second heat curve. Peak crystallization temperature is determined from the cooling curve.

Dynamic Mechanical Spectroscopy (DMS) Frequency Sweep
Melt rheology, constant temperature frequency sweeps, were performed using a TA Instruments Advanced Rheometric Expansion System (ARES) rheometer equipped with 25 mm parallel plates under a nitrogen purge. Frequency sweeps were performed at 190° C. for all samples at a gap of 2.0 mm and at a constant strain of 10%. The frequency interval was from 0.1 to 100 radians/second. The stress response was analyzed in terms of amplitude and phase, from which the storage modulus (G'), loss modulus (G"), and dynamic melt viscosity (η*) were calculated.

Gel Permeation Chromatography (GPC)
The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure.

With 3D-GPC, absolute weight average molecular weight ("$M_{w,Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, do/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

g' by 3D-GPC

The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight ($M_w$), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime ($g_i'$) is calculated for each branched sample chromatographic slice (i) and measuring molecular weight ($M_i$) according to Equation 7, as shown in FIG. 7, where the calculation utilizes the $IV_{linear\ reference,j}$ at equivalent molecular weight, wt, in the linear reference sample. In other words, the sample IV slice (i) and reference IV slice (j) have the same molecular weight ($M_i = M_j$). For simplicity, the $IV_{linear\ reference,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 8, as shown in FIG. 8, assuming a viscosity shielding epsilon factor of 0.75.

Finally, the average LCBf quantity per 1000 carbons in the polymer across all of the slices (i) can be determined using Equation 9, as shown in FIG. 9.

gpcBR Branching Index by 3D-GPC

In the 3D-GPC configuration the polyethylene and polystyrene standards can be used to measure the Mark-Houwink constants, K and a, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 10 and 11, FIGS. 10 and 11, respectively.

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

The area calculation in Equation 12, shown in FIG. 12, offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 13, as shown in FIG. 13, where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 14 and 15, as shown in FIGS. 14 and 15, respectively.

Equation 16, as shown in FIG. 16, is used to determine the gpcBR branching index, where [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation 12, as shown in FIG. 12, is commonly referred to as the absolute Mw; while the Mw,cc from Equation 14, as shown in FIG. 14, using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 12-16, as shown in FIG. 12-16, respectively.

The interpretation of gpcBR is straight forward. For linear polymers, gpcBR calculated from Equation 16, as shown in FIG. 16, will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer Intrinsic Viscosity (IV). In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

CEF Method

Comonomer distribution analysis is performed with Crystallization Elution Fractionation (CEF) (PolymerChar in Spain) (B. Monrabal et al, Macromol. Symp. 257, 71-79 (2007)). Ortho-dichlorobenzene (ODCB) with 600 ppm antioxidant butylated hydroxytoluene (BHT) is used as the solvent. Sample preparation is done with autosampler at 160° C. for 2 hours under shaking at 4 mg/ml (unless otherwise specified). The injection volume is 300 μl. The temperature profile of the CEF is: crystallization at 3° C./min from 110° C. to 30° C., thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

The CEF column is packed by the Dow Chemical Company with glass beads at 125 um±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. The temperature is calibrated by adjusting the elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in Equation 17, as shown in FIG. 17, where the column resolution is 6.0.

CDC Method

Comonomer distribution constant (CDC) is calculated from comonomer distribution profile by CEF. CDC is defined as Comonomer Distribution Index divided by Comonomer Distribution Shape Factor multiplying by 100 as shown in Equation 1, FIG. 1.

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in Equation 1, FIG. 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($w_T$(T)) from 35.0° C. to 119.0° C. with a temperature step increase of 0.200° C. from CEF according to Equation 2, as shown in FIG. 2;

(B) Calculate the median temperature ($T_{median}$) at cumulative weight fraction of 0.500, according to Equation 3, as shown in FIG. 3;

(C) Calculate the corresponding median comonomer content in mole % ($C_{median}$) at the median temperature ($T_{median}$) by using comonomer content calibration curve an, according to Equation 4, as shown in FIG. 4;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Equation 4 as shown in FIG. 4, wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according Equation 5, as shown in FIG. 5.

Conventional GPC $M_{w\text{-}gpc}$ Determination

To obtain Mw-gpc values, the chromatographic system consist of either a Polymer Laboratories Model PL-210 or a Polymer Laboratories Model PL-220 equipped with a refractive index (RI) concentration detector. The column and carousel compartments are operated at 140° C. Three Polymer Laboratories 10-µm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples are prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights shown in the Equation 26, as shown in FIG. 26 where M is the molecular weight, A has a value of 0.4316 and B is equal to 1.0.

A third order polynomial is determined to build the logarithmic molecular weight calibration as a function of elution volume. The weight-average molecular weight by the above conventional calibration is defined as $Mw_{cc}$ in the equation shown in Equation 27 as shown in FIG. 27. Where, the summation is across the GPC elution curve, with RI and $M_{cc}$ represents the RI detector signal and conventional calibration molecular weight at each GPC elution slice. Polyethylene equivalent molecular weight calculations are performed using Viscotek TriSEC software Version 3.0. The precision of the weight-average molecular weight ΔMw is excellent at <2.6%.

Creep Zero Shear Viscosity Measurement Method:

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ϵ vs. t, where ϵ is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-shear viscosity ratio (ZSVR) is defined as the ratio of the zero-shear viscosity (ZSV) of the branched polyethylene material to the ZSV of the linear polyethylene material at the equivalent weight average molecular weight (Mw-gpc) as shown in the Equation 18, as shown in FIG. 18.

The ZSV value is obtained from creep test at 190° C. via the method described above. The Mw-gpc value is determined by the conventional GPC method as described above. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-$d_2$ (TCE) and perchloroethylene (50:50, w:w) with 0.001M $Cr^{3+}$. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double presaturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$NCH_2 = I_{total}/2$

Figure 20:
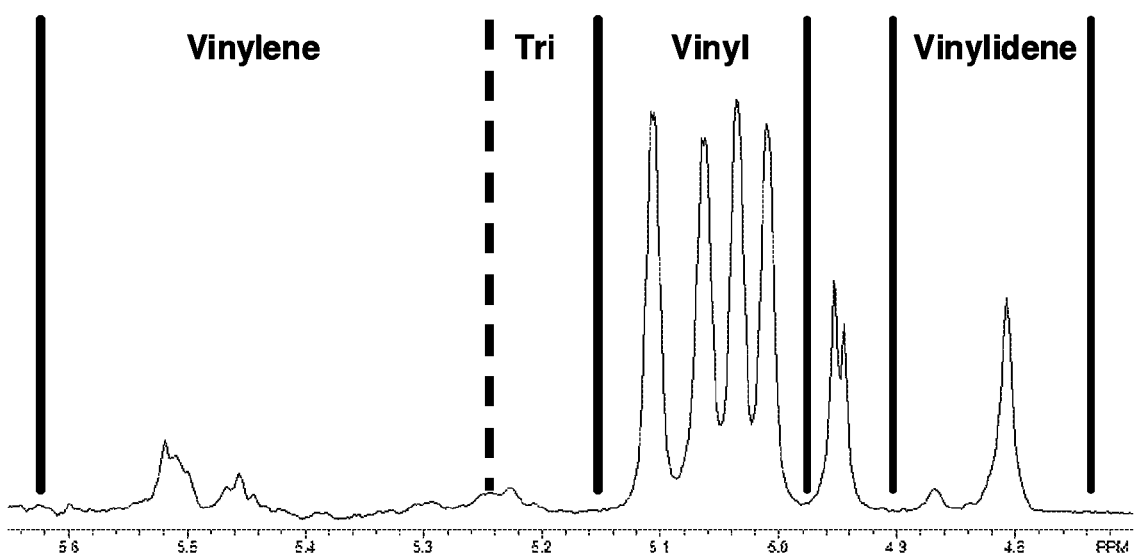
FIG. 20 is a graph illustrating integration limits for unsaturation for Example 3, the dash line means the position can be slightly different depends on the sample/catalyst.
Figure 22:
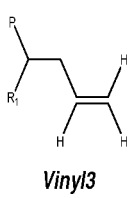
FIG. 22 illustrates chemical structure representations of unsaturations.
Figure 23:
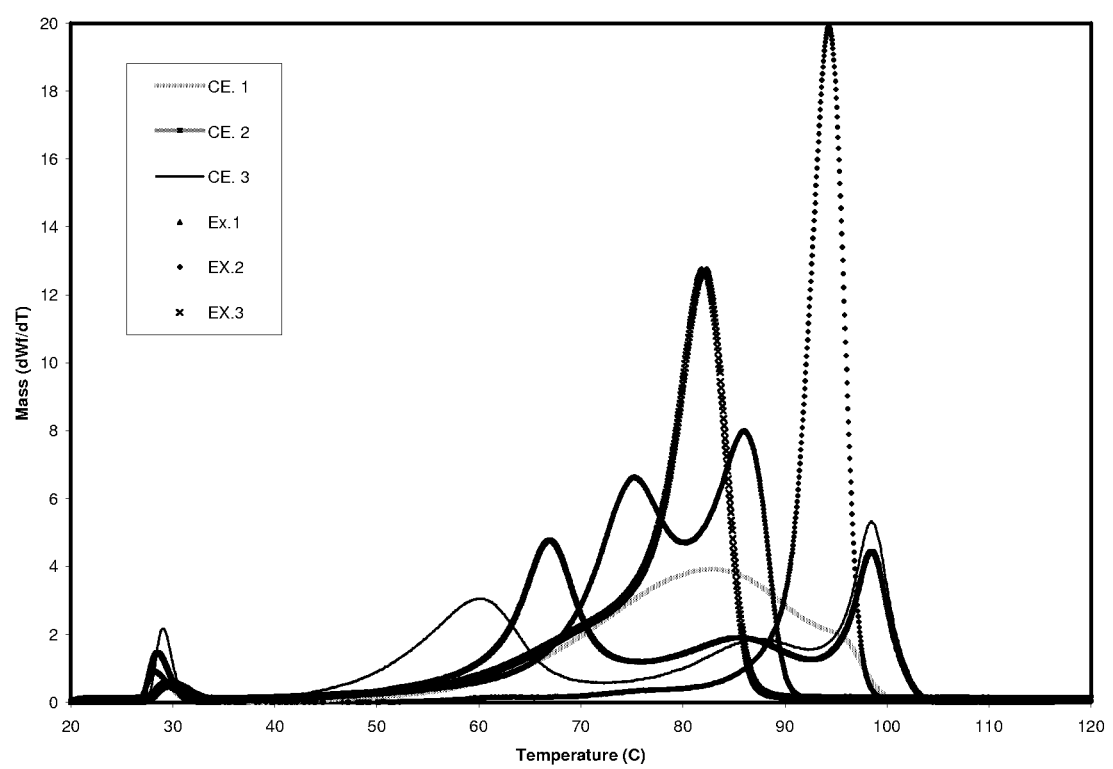
FIG. 23 is a graph illustrating the CEF overlays.
Figure 24:
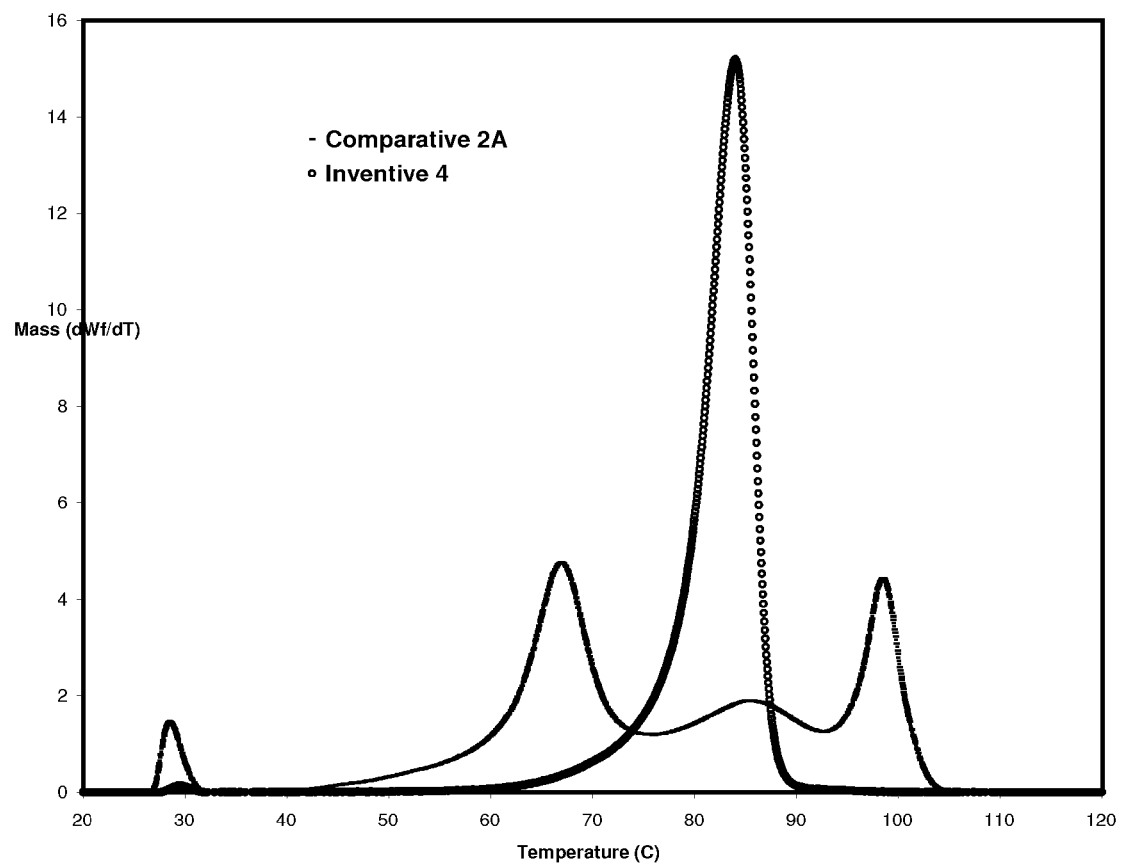
FIG. 24 is a graph illustrating the CEF profile of mass v. temperature of inventive and comparative examples.

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$)

were integrated based on the region shown in FIG. 20. The number of unsaturation unit for vinylene, trisubstituted, vinyl and vinylidene are calculated:

$$N_{vinylene} = I_{vinylene}/2$$

$$N_{trisubstituted} = I_{trisubstituted}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000\ C = (N_{vinylene}/NCH_2)*1,000,000$$

$$N_{trisubstituted}/1,000,000\ C = (N_{trisubstituted}/NCH_2)*1,000,000$$

$$N_{vinyl}/1,000,000\ C = (N_{vinyl}/NCH_2)*1,000,000$$

$$N_{vinylidene}/1,000,000\ C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1H$ signal from residual proton from TCT-d2. The control is run with ZG pulse, TD 32768, NS 4, DS12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1s, D13 13 s. The modified pulse sequences for unsaturation with Bruker AVANCE 400 MHz spectrometer are shown in FIG. 21.

Gel Content

Gel content is determined in accordance to ASTM D2765-01 Method A in xylene. The sample is cut to required size using a razor blade.

Film Testing Conditions

The following physical properties are measured on the films produced:

Total (Overall), Surface and Internal Haze: Samples measured for internal haze and overall haze are sampled and prepared according to ASTM D 1003. Internal haze was obtained via refractive index matching using mineral oil on both sides of the films. A Hazeguard Plus (BYK-Gardner USA; Columbia, Md.) is used for testing. Surface haze is determined as the difference between overall haze and internal haze.

45° Gloss: ASTM D-2457.

MD and CD Elmendorf Tear Strength: ASTM D-1922.

MD and CD Tensile Strength: ASTM D-882.

Dart Impact Strength: ASTM D-1709.

Puncture and Puncture Modified

Puncture: Puncture is measured on a Instron Model 4201 with Sintech Testworks Software Version 3.10. The specimen size is 6 inch×6 inch and 4 measurements are made to determine an average puncture value. The film is conditioned for 40 hours after film production and at least 24 hours in an ASTM controlled laboratory. A 100 lb load cell is used with a round specimen holder 12.56 square inches. The puncture probe is a ½ inch diameter polished stainless steel ball (on a 0.25 inch rod) with a 7.5 inch maximum travel length. There is no gauge length; the probe is as close as possible to, but not touching, the specimen. The crosshead speed used is 10 inches/minute. The thickness is measured in the middle of the specimen. The thickness of the film, the distance the crosshead traveled, and the peak load are used to determine the puncture by the software. The puncture probe is cleaned using a "Kim-wipe" after each specimen.

Puncture Modified: Same as Puncture Strength except the puncture probe is a 0.5 inch diameter polished stainless steel cylinder resting on a 0.5 inch rod.

Accelerated Nitrous Oxide (NOx) Gas Fading Test Method

The gas fading test is America Association Textile Chemist and Colorists (AATCC) test method 23-1994, and it assesses the color change of test specimen when exposed to atmospheric oxides of nitrogen as derived from the combustion of heating gas. The sample chamber allows exposure of samples to an atmosphere of air, which has passed over and contains the byproducts of combustion from a gas burner, in this case natural gas. The atmosphere inside the oven contains ~5 ppm of oxides of nitrogen, measured using Draeger tubes. The test is used to simulate storage at elevated temperatures in a warehouse with exposure to exhaust from fork lifts or gas powered heating systems producing oxides of nitrogen.

Film samples are placed in the gas fading oven at 60° C. Every 24 hours the degree of color change of the polymer is measured by recording the CIE L*a*b* values according to ASTM Method E 313, using a Minolta CM-2600d spectrophotometer. The International Commission on Illumination (usually abbreviated CIE for its French name, Commission internationale de l'éclairage) is the international authority on light, illumination, color, and color spaces and is today based in Vienna, Austria. In particular, the change in b* value gives the shift towards yellow (positive b* change) or blue (negative b* change) compared to an unexposed sample. The test is complete after 10 days of exposure.

Unless otherwise stated, implicit from the context or conventional in the art, all parts and percentages are based on weight.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

The film properties of the samples are shown in the following table. Example 6 shows advantages in tensile properties as compared to CE2 of improved MD break stress, peak load, and strain at break and CD break stress. The other properties shown in the following table for Ex. 6 are acceptable/good for use in heavy duty shipping sacks (HDSS) and other film applications. For the blends with 10% LDPE 133A, puncture is very similar between Ex. 6+10% LDPE 133A and CE2+10% LDPE 133A and advantages are seen for Ex. 6+10% LDPE 133A as compared to CE2+10% LDPE 133A of improved MD break stress, MD peak load, MD strain at break, MD stress at yield, CD break stress, and CD strain at yield.

Figure 25:
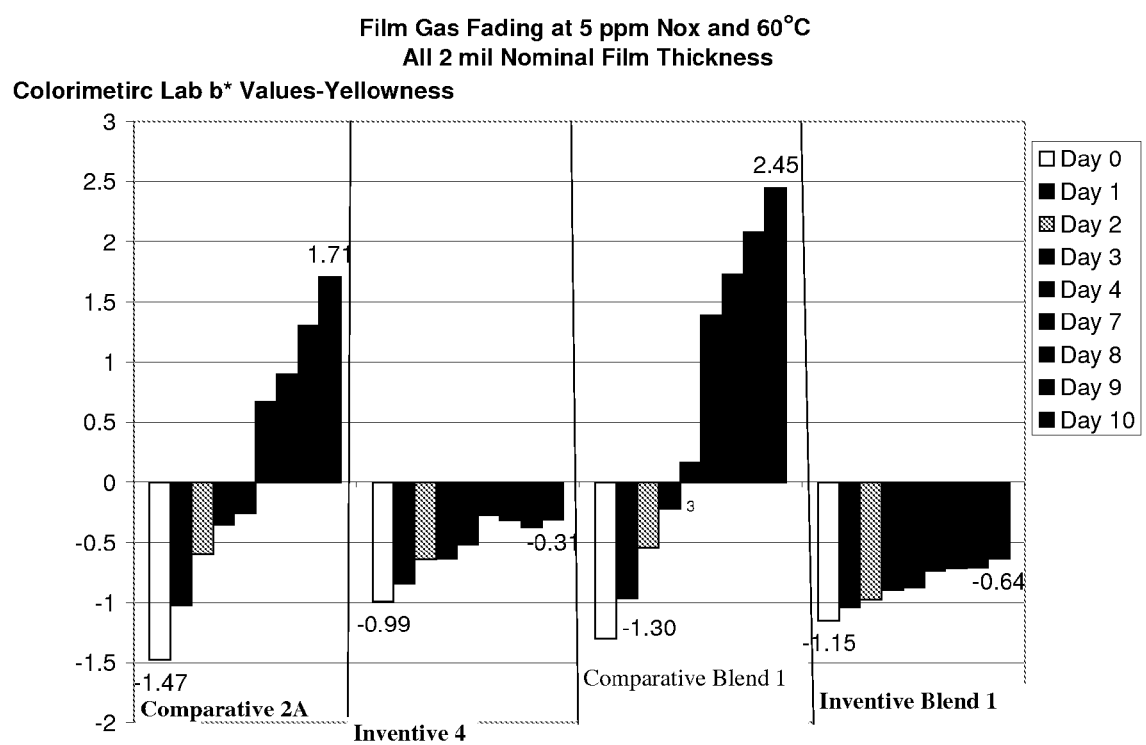
FIG. 25 is a graph illustrating gas fading at 5 ppm NOx and 60° C.

A primary advantage of this invention is shown in FIG. 25. In FIG. 25, films are tested by the Accelerated Nitrous Oxide (NOx) Gas Fading Test Method. Comparative Film 2A tended to yellow significantly after one day as seen in the b* axis increase. This result also was seen for blends with LDPE, namely 90% Comparative Blend 1. A CIE b* change of 1.5 units or less is considered acceptable under these test conditions after 10 days. Inventive Film 4 meets this requirement as shown with a change of 0.68 as compared to Comparative Film 2A of 3.18. Additionally, for blends with LDPE, Inventive Blend 1 had a b* change over 10 days of 0.51, meeting the desired requirement, and Comparative Blend 1 did not meet this requirement with a value of 3.75.

We claim:

1. An ethylene-based polymer composition characterized by a bimodal or multimodal molecular weight distribution, a Comonomer Distribution Constant greater than about 45 and as high as 400, wherein the composition has less than 120 total unsaturation unit/1,000,000 C.

2. The polymer composition of claim 1 wherein the composition comprises up to about 3 long chain branches/1000 carbons.

3. The polymer composition of claim 1 having a zero shear viscosity ratio (ZSVR) of at least 2.

4. The polymer composition of claim 3 further characterized by comprising less than 20 vinylidene unsaturation unit/1,000,000 C.

5. A fabricated article comprising the composition of claim 1.

6. The fabricated article of claim 5 in the form of at least one film layer.

7. The polymer composition of claim 1 further comprising a single DSC melting peak.

8. A thermoplastic formulation comprising the composition of claim 1 and at least one natural or synthetic polymer.

9. The formulation of claim 8 wherein a film comprising the formulation is characterized as having a yellowness b* change over 10 days of 3 or less.

10. The formulation of claim 9 wherein the ethylene-based composition comprises from about 60 to about 95 percent by weight of the formulation.

11. The composition of claim 1, wherein said composition has been at least partially cross-linked (at least 5 wt % gel).

12. The composition of claim 1 wherein the composition has a comonomer distribution profile comprising a mono or bimodal distribution from 35° C. to 120° C., excluding purge.

13. The polymer composition of claim 1 further comprising Mw from about 17,000 to about 220,000 g/mol.

14. The ethylene-based polymer composition of claim 1 wherein a film comprising the composition is characterized as having a yellowness b* change over 10 days of 3 or less.

15. The ethylene-based polymer composition of claim 1 wherein a film comprising the composition is characterized as having a yellowness b* change over 10 days of 2 or less.

16. The ethylene-based polymer composition of claim 1 wherein a film comprising the composition is characterized as having a yellowness b* change over 10 days of 1 or less.

17. A polymerization process comprising:

(A) polymerizing ethylene and optionally one or more α-olefins in the presence of a first catalyst to form a semi-crystalline ethylene-based polymer in a first reactor or a first part of a multi-part reactor; and (B) reacting freshly supplied ethylene and optionally one or more α-olefins in the presence of a second catalyst comprising an organometallic catalyst thereby forming an ethylene-based polymer composition in at least one other reactor or a later part of said multi-part reactor, wherein the catalyst of (A) and (B) can be the same or different and each is a metal complex of a polyvalent aryloxyether corresponding to the formula:

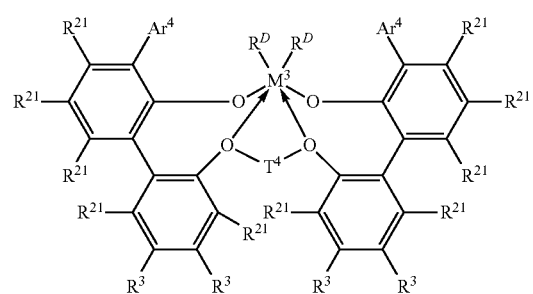

where $M^3$ is Ti, or Hf;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

* * * * *